US010093486B2

(12) United States Patent
Andreoli

(10) Patent No.: US 10,093,486 B2
(45) Date of Patent: Oct. 9, 2018

(54) GUIDE FOR CHAIN FOR ARTICLES CONVEYOR

(71) Applicant: REXNORD FLATTOP EUROPE S.R.L., Correggio (IT)

(72) Inventor: Andrea Andreoli, Modena (IT)

(73) Assignee: REXNORD FLATTOP EUROPE S.R.L., Correggio (IT)

( * ) Notice: Subject to any disclaimer, the term of this patent is extended or adjusted under 35 U.S.C. 154(b) by 0 days.

(21) Appl. No.: 15/550,878

(22) PCT Filed: Feb. 17, 2016

(86) PCT No.: PCT/EP2016/053379
§ 371 (c)(1),
(2) Date: Aug. 14, 2017

(87) PCT Pub. No.: WO2016/131879
PCT Pub. Date: Aug. 25, 2016

(65) Prior Publication Data
US 2018/0022553 A1    Jan. 25, 2018

(30) Foreign Application Priority Data
Jun. 19, 2015   (IT) .................. 102015000025644

(51) Int. Cl.
*B65G 21/00*   (2006.01)
*B65G 21/20*   (2006.01)
*B65G 17/06*   (2006.01)

(52) U.S. Cl.
CPC ....... *B65G 21/2009* (2013.01); *B65G 17/066* (2013.01); *B65G 2201/02* (2013.01)

(58) Field of Classification Search
CPC .................. B65G 21/2009; B65G 17/066
(Continued)

(56) References Cited

U.S. PATENT DOCUMENTS 2,884,118 A *  4/1959  Williams ............. B65G 17/086
                                                                        198/852
2,954,113 A     9/1960  Hibbard
(Continued)

FOREIGN PATENT DOCUMENTS

DE    29619696    1/1997
EP    0286173    10/1988
EP    0509605    10/1992

OTHER PUBLICATIONS

EPO, International Search Report PCT/EP2016/053379, dated Apr. 8, 2016.

*Primary Examiner* — Joseph A Dillon, Jr.
(74) *Attorney, Agent, or Firm* — Quarles & Brady LLP

(57) ABSTRACT

A guide for a chain (105) for an articles conveyor (100) is proposed. Said guide comprises a return guide ($110_R$;$210_R$; $310_R$) being adapted to guide the chain (105) along at least a portion of a return section of a conveyor path of the articles conveyor (100). The chain (105) comprises a plurality of links (115) each one having a first link element ($115_1$) for supporting the articles to be conveyed and a second link element ($115_2$) for supporting the first link element ($115_1$). The return guide ($110_R$;$210_R$;$310_R$) comprises a return chain guide channel ($125_R$;$225_R$;$325_R$) along the return guide ($110_R$;$210_R$;$310_R$), said return chain guide channel ($125_R$; $225_R$;$325_R$) extending within the return guide ($110_R$;$210_R$; $310_R$) from a surface ($110_{RB}$;$210_{RB}$;$310_{RB}$) of the return guide ($110_R$;$210_R$;$310_R$) that, in use, defines a lower outer surface of the guide. The return guide ($110_R$;$210_R$;$310_R$) further comprises return guide magnetic interaction means ($130_R$,135;$230_R$,235;$330_R$,335) adapted in use to magnetically interact with chain magnetic interaction means (120) to cause a magnetic attraction of the chain (105) within the return chain guide channel ($125_R$;$225_R$;$325_R$), SO that by effect of said magnetic attraction said return chain guide (Continued)

channel ($125_R$;$225_R$;$325_R$) is adapted to slidably receive within it the second link element ($115_2$), and said surface ($110_{RB}$;$210_{RB}$;$310_{RB}$) of the return guide ($110_R$;$210_R$;$310_R$) is adapted to provide a slide abutment, external to the return guide ($110_R$;$210_R$;$310_R$), for the first link element ($115_1$). The guide further comprises accompanying means (140,145, 150) for accompanying the movement of the chain (105) with respect to said return chain guide channel ($125_R$;$225_R$; $325_R$), said accompanying means (140,145,150) comprising: means (145) for promoting an input of the chain (105) into, and magnetic attraction and retention of the chain (105) within, said return chain guide channel ($125_R$;$225_R$;$325_R$), and means (150) for promoting an output of the chain (105) from said return chain guide channel ($125_R$;$225_R$;$325_R$).

20 Claims, 11 Drawing Sheets

(58) Field of Classification Search
USPC ...................... 198/805, 690.1, 841
See application file for complete search history.

(56) References Cited

U.S. PATENT DOCUMENTS

| | | | | |
|---|---|---|---|---|
| 3,581,873 A * | 6/1971 | Spodig | ............... | B23Q 3/154 |
| | | | | 198/690.1 |
| 3,944,059 A * | 3/1976 | Garvey | ............... | B65G 17/066 |
| | | | | 198/850 |
| 3,964,800 A * | 6/1976 | Grimes | ............... | B65G 21/20 |
| | | | | 198/841 |
| 4,051,946 A * | 10/1977 | Buccicone | ......... | B65G 21/2018 |
| | | | | 198/679 |
| 4,623,061 A * | 11/1986 | Pentith | ............... | B65G 15/04 |
| | | | | 198/805 |
| 4,643,298 A * | 2/1987 | Wallaart | ............... | B65G 21/06 |
| | | | | 198/690.1 |
| 4,742,906 A | 5/1988 | Wallaart | | |
| 4,805,764 A * | 2/1989 | van Zijderveld, Jr. | ................... | |
| | | | | B65G 21/2009 |
| | | | | 198/805 |
| 4,823,939 A * | 4/1989 | Langhans | ............... | B65G 21/2009 |
| | | | | 198/805 |
| 4,892,186 A * | 1/1990 | Frei | ............... | B65G 17/46 |
| | | | | 198/805 |
| 5,027,942 A | 7/1991 | Wallaart | | |
| 5,036,969 A * | 8/1991 | Garbagnati | ......... | B65G 21/2009 |
| | | | | 198/690.1 |
| 5,176,247 A * | 1/1993 | Counter | ............... | B65G 17/086 |
| | | | | 198/831 |
| 5,199,551 A * | 4/1993 | Wallaart | ............... | B65G 21/2009 |
| | | | | 198/805 |
| 5,295,568 A * | 3/1994 | Saito | ............... | B66B 29/02 |
| | | | | 198/330 |
| 5,890,583 A * | 4/1999 | Garbagnati | ......... | B65G 21/2009 |
| | | | | 198/805 |
| 5,947,361 A * | 9/1999 | Berger | ............... | B41F 13/03 |
| | | | | 198/370.01 |
| 6,073,754 A * | 6/2000 | Garbagnati | ......... | B65G 21/2009 |
| | | | | 198/805 |
| 6,085,896 A * | 7/2000 | van Zijderveld | ......... | B65G 17/08 |
| | | | | 198/805 |
| 6,129,201 A * | 10/2000 | Langhans | ............... | B65G 21/2009 |
| | | | | 198/805 |
| 6,155,406 A * | 12/2000 | Garbagnati | ......... | B65G 21/2009 |
| | | | | 198/805 |
| 6,357,574 B1 * | 3/2002 | Eberle | ............... | B65H 29/003 |
| | | | | 198/465.4 |
| 6,601,696 B1 * | 8/2003 | van Zijderveld | .. | B65G 21/2009 |
| | | | | 198/805 |
| 6,957,734 B2 * | 10/2005 | Imai | ............... | B23Q 7/035 |
| | | | | 198/472.1 |
| 7,121,400 B2 * | 10/2006 | Fandella | ............... | B65G 17/086 |
| | | | | 198/619 |
| 7,131,528 B1 * | 11/2006 | Rathgeber | ............... | B65G 21/2009 |
| | | | | 198/805 |
| 7,597,188 B2 * | 10/2009 | Volpi | ............... | B29C 45/0013 |
| | | | | 198/690.1 |
| 7,694,804 B2 * | 4/2010 | Stoiber | ............... | B65G 21/2009 |
| | | | | 198/690.1 |
| 8,434,613 B2 * | 5/2013 | Ozaki | ............... | B65G 23/18 |
| | | | | 198/690.1 |
| 8,695,784 B2 * | 4/2014 | Ota | ............... | B65G 15/32 |
| | | | | 198/459.6 |
| 9,428,347 B2 * | 8/2016 | Kleinikkink | ............ | B65G 54/02 |

* cited by examiner

GUIDE FOR CHAIN FOR ARTICLES CONVEYOR

CROSS-REFERENCE TO RELATED APPLICATIONS

This application represents the national stage entry of PCT International Application No. PCT/EP2016/053379 filed on Feb. 17, 2016 and claims priority to Italian Patent Application No. MI2015A0002255 filed Feb. 18, 2015 and Italian Patent Application No. 102015000025644 filed Jun. 19, 2015, the contents of which are hereby incorporated by reference as if set forth in their entirety herein.

FIELD OF THE INVENTION

The present invention generally relates to articles conveyors. More particularly, the present invention relates to a guide for a chain for an articles conveyor.

PRIOR-ART DISCUSSION

An articles conveyor typically comprises a movable closed-loop support element adapted to support the articles, and drive elements (for example, electric motors, pinions and cogwheels) for moving the support element along a predefined path (thereby allowing the articles supported thereon to be conveyed).

A very common type of conveyor makes use of a chain as support element, which typically is configured in such a way to flex/bend upward and downward (for example, so as to be moved around pinions and cogwheels), and to curve rightward and leftward along the path. In order to achieve that, the chain typically comprises a succession of links coupled to each other with the possibility of relative movement (so that, in correspondence of a flexure of the path, each link can bend with respect to the adjacent link), and each link comprises a plate for supporting the articles to be conveyed and a link body for supporting the plate and allowing the coupling between adjacent links.

Along each non-rectilinear forward and/or return section of the conveying path (for example, in curve), the articles conveyors are typically provided with specific forward and/or return guides for guiding the chain/chains in a fluid and stable manner (i.e., in such a manner to avoid jamming, impact and rapid wear).

Solutions are known (for example, the solution illustrated in U.S. Pat. No. 4,742,906) wherein the return guide comprises a channel adapted to receive and support the chain, so that the chain is stably guided along the return guide within the channel. In order to achieve that, the channel is provided with grooves adapted to receive the link plates (which plates typically have an extension, in plan view, greater than the link bodies) and to support them from below.

EP0286173 discloses a chain conveyor, which comprises a track including at least one bend zone and a conveyor chain. The track comprises two spaced parallel rails over which the chain can move. The chain has links presenting a substantially rectangular carrying surface made of synthetic plastics material and a connecting system situated below the carrying surface and including hinge eyes on opposite sides of each link and a hinge pin of ferromagnetic material passed through the hinge eyes of each pair of adjacent links, thereby hinging adjacent links together. The chain is capable of flexing not only about the hinge pins but also in the plane of transport defined by the carrying surfaces of the successive links. Guide surfaces depend from the underside of the carrying surfaces for guiding the chain laterally relative to the rails. The maximum perpendicular distance between these guide surfaces is shorter than the minimum perpendicular distance between the guide surfaces formed on the rails. Exclusively in the bend zones of the track, in the space between the two rails, under the connecting system of the links, means are provided for generating a magnetic field to exercise attraction on the hinge pins and thereby to hold the chain flat on the rails in the bend zone.

U.S. Pat No. 5,027,942 discloses a chain conveyor comprising a chain movable over a track having one or more bends therein, comprising chain links having a substantially rectangular carrying surface with adjacent chain links in the chain being hinged together, and comprising a magnetic field generator at least in the outside bend zones of the track, and wherein the chain links are made of magnetizable material.

SUMMARY OF THE INVENTION

The applicant has noticed that the known solutions of return guides (for example, the solution illustrated in U.S. Pat. No. 4,742,906) are limited to the use with chains whose links have plates of specific size, i.e. such return guides cannot be adapted to chains with plates of any thickness (for example, in case of replacement of the chain). In fact, in order to impart an optimum guidance of the chain, the grooves are sized so as to accommodate the plates with a reduced mechanical play—so that, depending on the thickness of the plates, return guides with different structures (i.e., with different size of the grooves) are necessary.

In addition, since each return guide is typically made from a sheet of thermoplastic material from which one or more channels are obtained by removal of material, the need of making the grooves (also derived by removal of material from the same sheet of thermoplastic material) involves waste of material and additional machining processes.

These issues are exacerbated in multi-channel return guides (i.e., in return guides with side by side channels) for chains arranged in parallel. In this case, in fact, the overall size (in plan view) of the grooves requires to make the channels mutually vertically staggered (thus avoiding that the grooves between the channels "interfere" with each other).

In addition, the Applicant has also understood that the solutions disclosed in EP0286173 and in U.S. Pat. No. 5,027,942 cannot be applied to return guides. Indeed, a return guide based on the teachings of EP0286173 and/or U.S. Pat. No. 5,027,942 would not work, especially in presence of detachments of one or more chain links from the return guide (e.g., due to interventions on the articles conveyor, such as inspection or cleaning, or temporary magnetic attraction failure). In this case, for effect of the chain weight, any detachment would propagate back to the inlet of the return guide and/or forward to outlet of the return guide, which impairs the operation of the whole articles conveyor and requires laborious repositioning operations.

The Applicant has devised a guide for chains for articles conveyors able to overcome the above-mentioned, as well as other, issues.

In particular, one or more aspects of the present invention are indicated in the independent claims, with advantageous features of the same invention that are indicated in the dependent claims, whose text is incorporated herein verbatim by reference (with any advantageous feature provided with reference to a specific aspect of the present invention that applies mutatis mutandis to any other aspect thereof).

More specifically, an aspect of the present invention proposes a guide for a chain for an articles conveyor. Said guide comprises a return guide being adapted to guide the chain along at least a portion of a return section of a conveyor path of the articles conveyor. The chain comprises a plurality of links each one having a first link element for supporting the articles to be conveyed and a second link element for supporting the first link element. The return guide comprises a return chain guide channel along the return guide, said return chain guide channel extending within the return guide from a surface of the return guide that, in use, defines a lower outer surface of the guide. The return guide further comprises return guide magnetic interaction means adapted in use to magnetically interact with chain magnetic interaction means to cause a magnetic attraction of the chain within the return chain guide channel, so that by effect of said magnetic attraction said return chain guide channel is adapted to slidably receive within it the second link element, and said surface of the return guide is adapted to provide a slide abutment, external to the return guide, for the first link element.

According to an embodiment of the present invention, said return guide magnetic interaction means comprises at least one magnetic field generation element and, preferably, said chain magnetic interaction means comprises at least one element of the chain responsive to magnetic fields.

According to an embodiment of the present invention, said return guide magnetic interaction means comprises a plurality of magnets along said return chain guide channel.

According to an embodiment of the present invention, said return chain guide channel extends within the return guide from said surface of the return guide towards a further surface of the return guide opposite to said surface, and preferably comprises a first wall parallel to said surface of the return guide. Said return guide magnetic interaction means is advantageously arranged in the return guide between said first wall and said further surface of the return guide.

According to an embodiment of the present invention, said return chain guide channel extends within the return guide from said surface of the return guide towards said further surface of the return guide by such an extent that, as a result of said magnetic attraction, the second link element is slidably received within the return chain guide channel up to the proximity of said first wall.

According to an embodiment of the present invention, said return chain guide channel comprises a second wall and a third wall parallel to each other and perpendicular to said first wall, said second and third wall being preferably spaced apart so that, as a result of said magnetic attraction, the second link element is slidably received within the return chain guide channel in contact with said second or said third wall.

According to an embodiment of the present invention, said guide magnetic interaction means are housed in a plurality of seats formed along the return chain guide channel and each one preferably extending within the guide from said first wall.

According to an embodiment of the present invention, each seat is accessible from below when the guide is in operating position, so that in use the guide itself acts as a shield against penetration of liquids, sludge and dirt into the seat housing the guide magnetic interaction means.

According to an embodiment of the present invention the guide further comprises a forward guide adapted to guide the chain along at least a portion of a forward section of the conveyor path of the articles conveyor, said forward guide preferably comprising a forward chain guide channel preferably opposite to said return chain guide channel. Advantageously, said forward chain guide channel extends within the guide from a surface of the forward guide opposed to said surface of the return guide and that, in use, preferably defines an upper outer surface of the guide. Preferably, said chain magnetic interaction means causes a magnetic attraction of the chain into the forward chain guide channel so that by effect of said magnetic attraction said forward chain guide channel is adapted to slidably receive within it the second link element, and said surface of the forward guide is advantageously adapted to provide a slide abutment, preferably external to the guide, for the first link element.

According to an embodiment of the present invention, said forward chain guide channel extends within the guide from the surface of the forward guide and preferably comprises a second wall, preferably parallel to said surface of the return guide. Said seats for the guide magnetic interaction means advantageously extend within the guide from said first wall towards said second wall.

According to an embodiment of the present invention, said guide magnetic interaction means comprises, preferably in each one of said seats, at least one pair of permanent magnets preferably magnetically coupled to a plate in ferromagnetic material.

According to an embodiment of the present invention, said plate acts as a cap, preferably a removable cap, for closing a respective seat.

According to an embodiment of the present invention the guide further comprises accompanying means for accompanying the movement of the chain with respect to said return chain guide channel, said accompanying means comprising means for promoting an input of the chain into, and magnetic attraction and retention of the chain within, said return chain guide channel, and means for promoting an output of the chain from said return chain guide channel.

According to an embodiment of the present invention, the guide further comprises adjusting means for adjusting a position of said accompanying means with respect to the return chain guide channel.

According to an embodiment of the present invention, said accompanying means comprises at least one idle roller.

According to an embodiment of the present invention, said accompanying means further comprises means for supporting the chain between an inlet and an outlet of the return chain guide channel.

BRIEF DESCRIPTION OF THE FIGURES

One or more embodiments of the present invention, as well as further features and the related advantages, will be better understood with reference to the following detailed description, given purely by way of non-limitative example only, to be read in conjunction with the accompanying figures (wherein corresponding elements are indicated with the same or similar references and their explanation is not repeated for the sake of brevity). In this regard, it is expressly understood that the figures are not necessarily drawn to scale (with some details that may be exaggerated and/or simplified) and that, unless otherwise indicated, they are merely used to conceptually illustrate the described structures and procedures. In particular.

DESCRIPTION OF EMBODIMENTS OF THE INVENTION

Figure 1A:
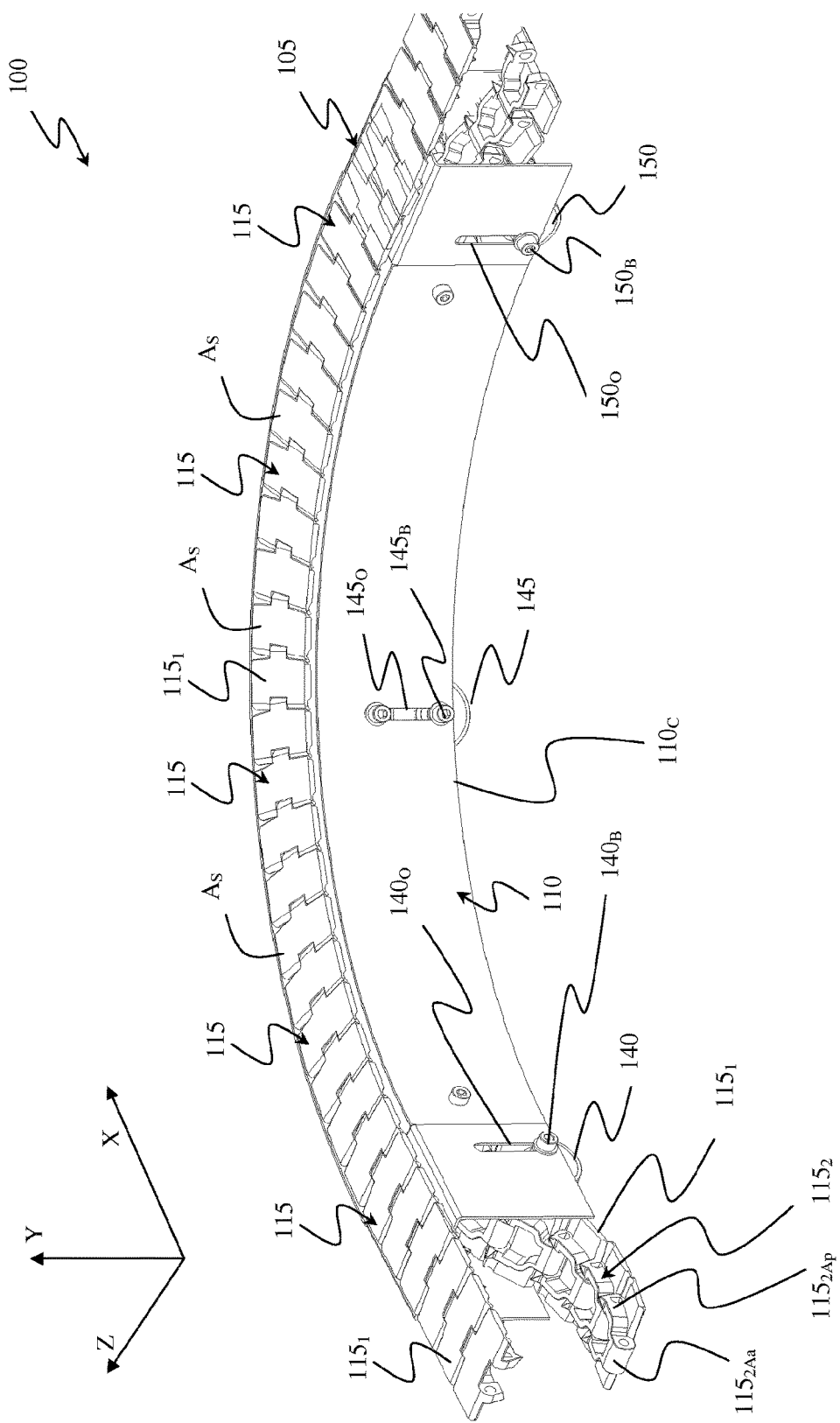
FIG. 1A shows a perspective view of an articles conveyor according to an embodiment of the present invention.

With reference to FIG. 1A, it shows a perspective view of an articles conveyor 100 (i.e. of a portion thereof), for industrial or civil use, according to an embodiment of the present invention. In the following, directional terminology (for example, top, bottom, upper, lower, side, central, longitudinal, transverse, vertical) associated with the articles conveyor 100 and its components will be used only in relation to their orientation in the figures, and will not be indicative of any specific orientation (among the various possible) of use thereof. The term "substantially" will be used to account for (desired or undesired) manufacturing tolerances.

In the following, for ease of description, FIG. 1A will be discussed jointly with FIGS. 1B and 1C, which show a close-up perspective view, and a close-up perspective view with partially removed parts, respectively, of the articles conveyor 100, and to the FIGS. 1D and 1E, which show, respectively, a bottom perspective view and a bottom perspective view with partially removed parts of the articles conveyor 100.

The articles conveyor 100 comprises a movable chain 105, drive elements (for example, electric motors, pinions and cogwheels, not shown) for moving/driving the chain 105 along a predefined path (i.e. along a respective forward—for example, upper-section that allows the articles to be conveyed, and along a respective return—for example, lower-section complementary to the forward section), and a guide structure (or guide) 110 for guiding the chain 105 along said path.

The chain 105 structure, non-limiting for the present invention, will be briefly discussed here below by referring only to functional elements deemed relevant for the understanding of the present invention.

The chain 105 comprises a plurality of links 115 each one identifying a rest/support surface $A_S$ (an upper surface, taking as reference the forward section) for the articles to be conveyed, with the rest surfaces $A_S$ of the links 115 that, in the forward section, define as a whole a rest plane of the chain 105. Each link 115 comprises a first link element (in the illustrated example, a plate) $115_1$ for supporting the articles to be conveyed and a second link element (in the illustrated example, a link body) $115_2$ for supporting the plate $115_1$. In the exemplary (but not limiting) embodiment illustrated, the surface of the plate $115_1$ that is exposed in the forward section identifies most of the rest surface $A_S$ of the respective link 115—reason why, in the following, for the sake of description ease and brevity, it will be assumed that the rest surface $A_S$ of each link 115 is identified only by the surface of the respective plate $115_1$.

The chain 105 is designed so as to be able to flex/bend upwards and downwards with respect to a vertical direction Y (orthogonal to the rest plane of the chain 105). In order to achieve that, in the exemplary (but not limiting) illustrated embodiment, the chain 105 comprises an aligned succession/sequence of links 115 pivotally coupled to each other (being for example hinged to each other), with each link 115 that is pivotally coupled to an adjacent link 115 along a longitudinal direction X (for example, the feed/movement direction of the chain 105) by means of a respective coupling pin 120 (for example, arranged along a transverse direction Z orthogonal to the longitudinal direction X and to the vertical direction Y). In this way, in correspondence of a flexure of the path, each link 115 is able to flex (in the vertical direction Y) with respect to the adjacent link 115 as a result of the relative rotation about the respective coupling pin 120. It should be noted that, in a path curve (such as the one herein illustrated by way of example), the longitudinal direction X can be identified as the direction tangent to the curve—in fact, in FIGS. 1A, 1B and 1C, the longitudinal direction is exemplarily illustrated as the direction followed by the leftmost links 115 of the succession.

The chain 105 is also designed such as to be able to curve (leftwards and, as illustrated, rightwards with respect to the longitudinal direction X). This is typically (although not necessarily) achieved by means of a suitable mechanical play of the coupling (for example, hinging) between the link bodies $115_2$ of each link 115.

Figure 1B:
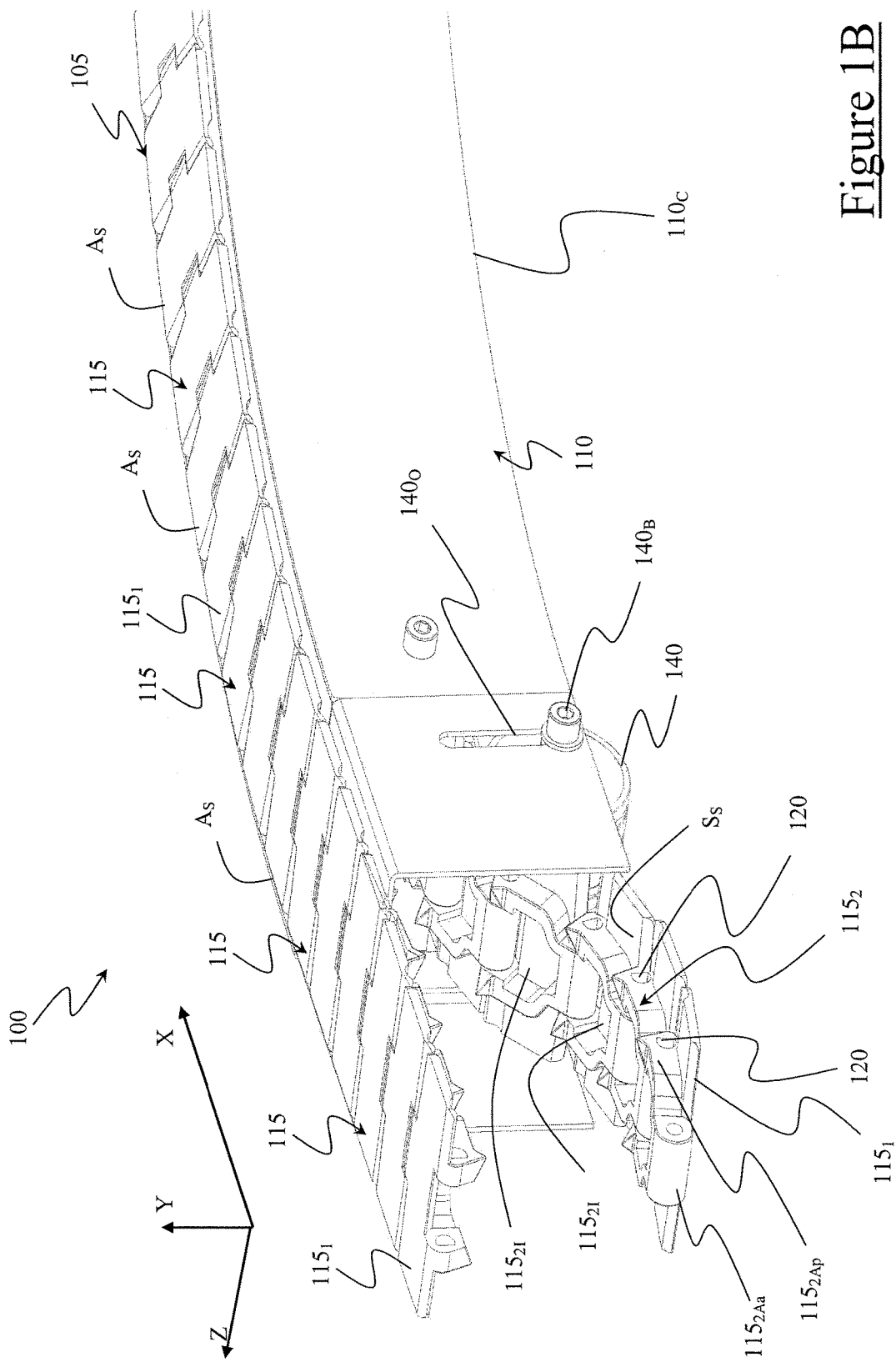
FIGS. 1B and 1C show a close-up perspective view, and a close-up perspective view with partially removed parts, respectively, of said articles conveyor according to an embodiment of the present invention.
Figure 1C:
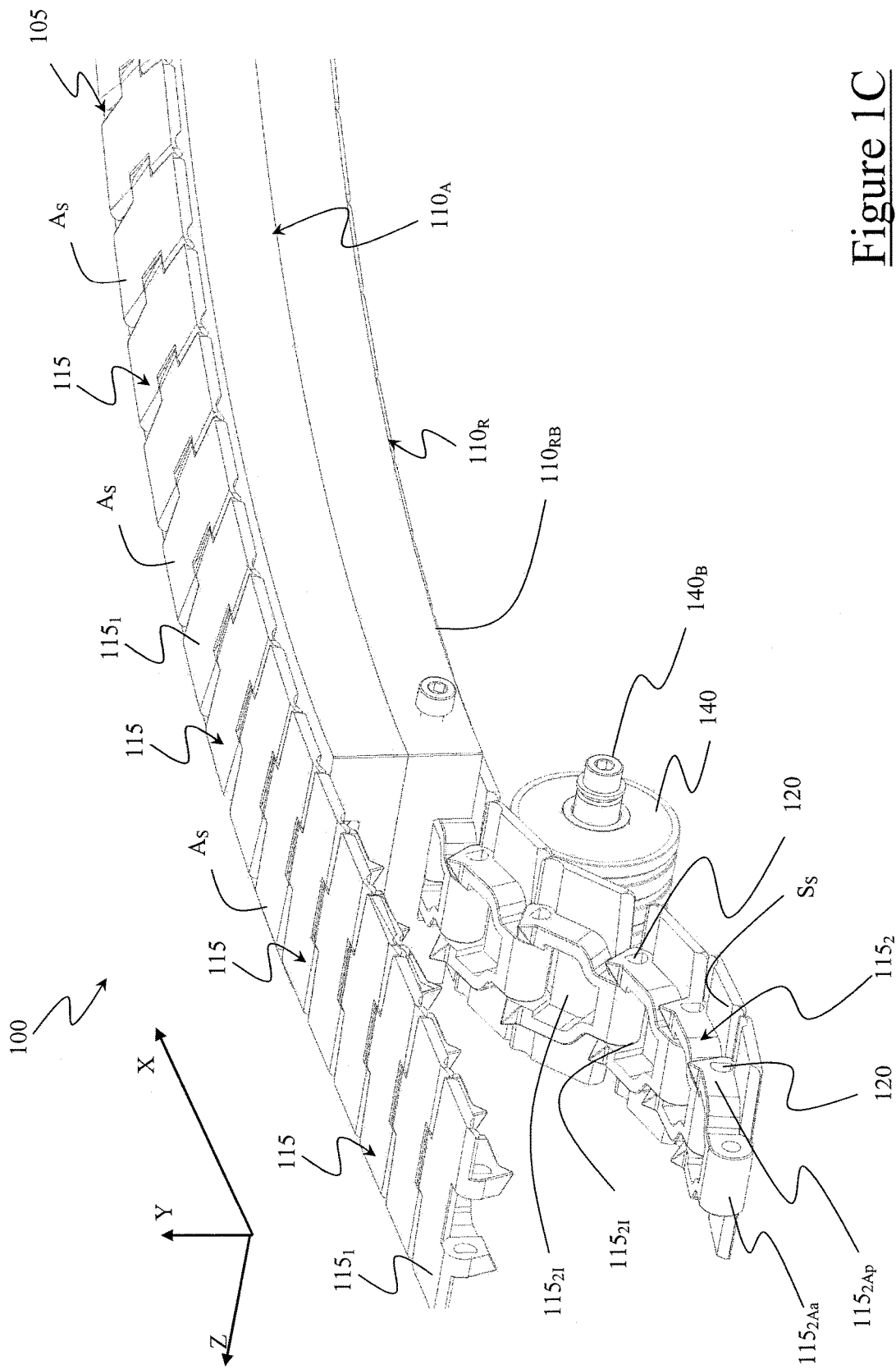

As can be better appreciated in FIGS. 1B and 1C, the link body $115_2$ of each link 115 comprises coupling regions (for example, a front coupling region $115_{2Aa}$ and a rear coupling region $115_{2Ap}$) to allow coupling to the adjacent links 115 (i.e., to the adjacent link bodies $115_2$), for example, by insertion of coupling pins 120 in the respective through holes of the front coupling region $115_{2Aa}$ of each link 115 and of the rear coupling region $115_{2Ap}$ of the adjacent link, and a fitting region $115_{2I}$ (for example, substantially delimited by the front coupling region $115_{2Aa}$ and the rear coupling region $115_{2Ap}$) for fitting into it the pinions and the cogwheels that allow the movement of the chain 105. In addition, taking as reference the forward section, each link body $115_2$ extends substantially below (or, taking as reference the return section, above) the respective plate $115_1$ (i.e., from a secondary surface $S_S$ thereof opposite the rest surface $A_S$) along the vertical direction Y.

Figure 1D:
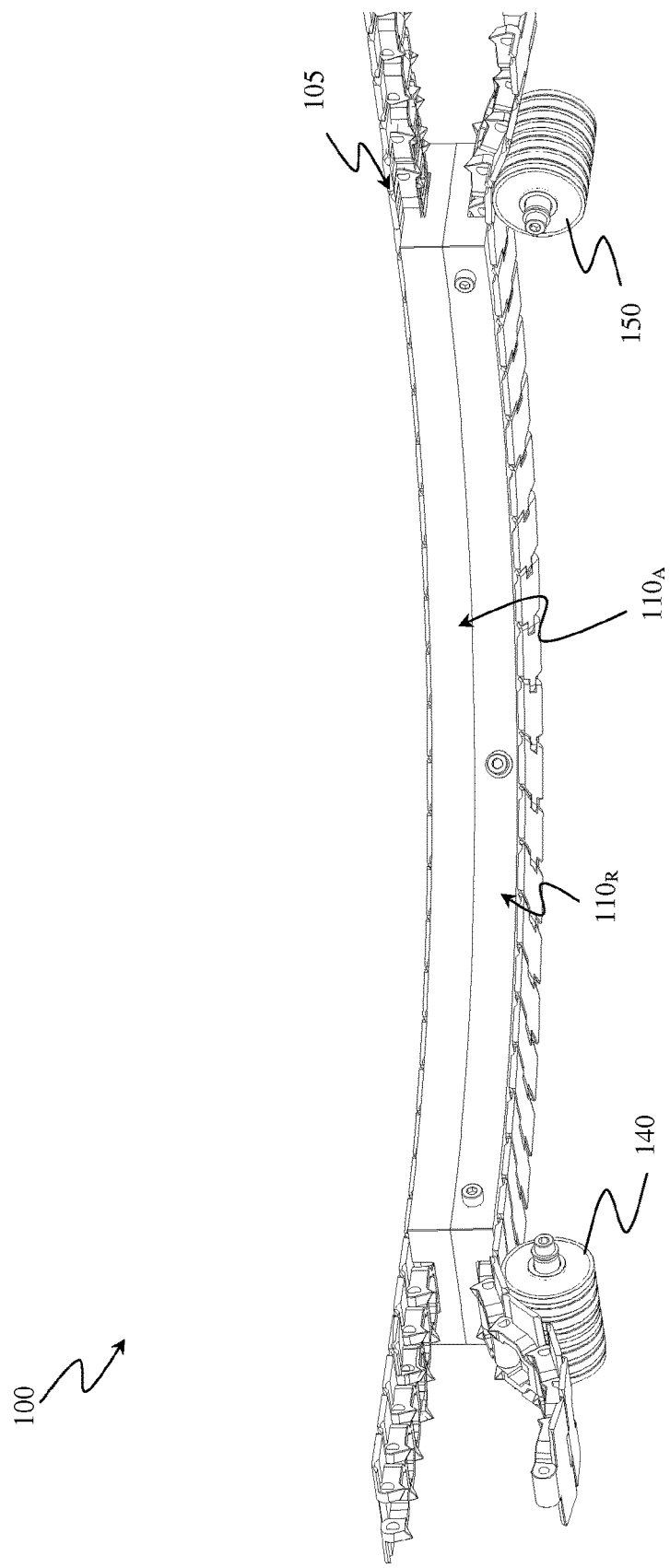
FIGS. 1D and 1E show a bottom perspective view, and a bottom perspective view with partially removed parts, respectively, of said articles conveyor according to an embodiment of the present invention.

The guide structure 110 comprises a protective casing (carter) $110_C$, inside which a forward guide $110_A$ for guiding the chain 105 along the forward section (or at least a part thereof) and a return guide $110_R$ for guiding the chain 105 along the return section (or at least a part thereof) are provided—see FIGS. 1C and 1D, wherein the guide structure 110 is shown without the carter $110_C$. In the exemplary (but not limiting) illustrated embodiment, the forward guide $110_A$ and the return guide $110_R$ are configured to guide the chain 105 along the same path curve—in any case, nothing prevents from making forward guides $110_A$ and return guides $110_R$ in parts (of the forward section and the return section, respectively) that are mutually different.

Figure 1E:
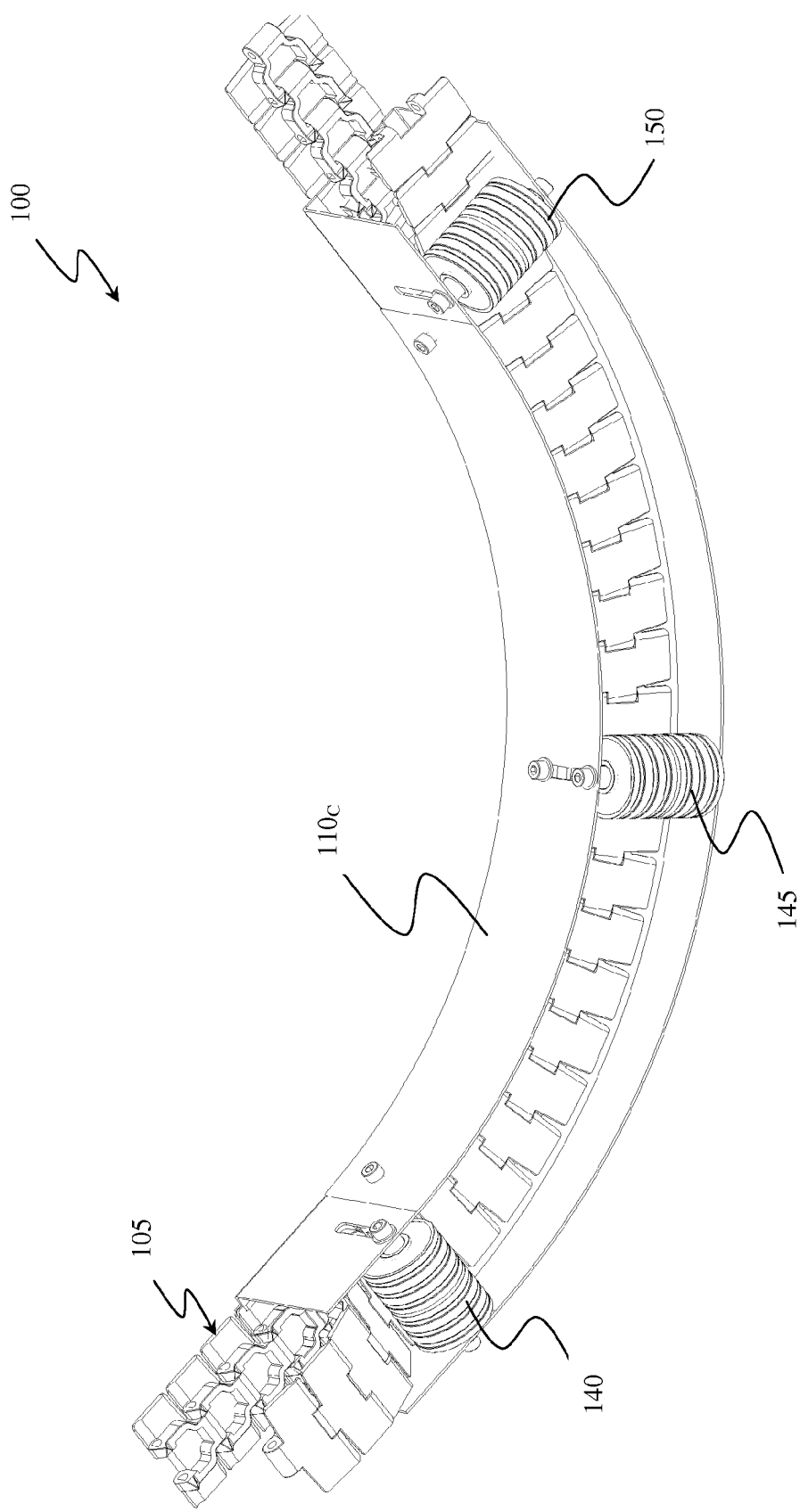
Figure 1F:
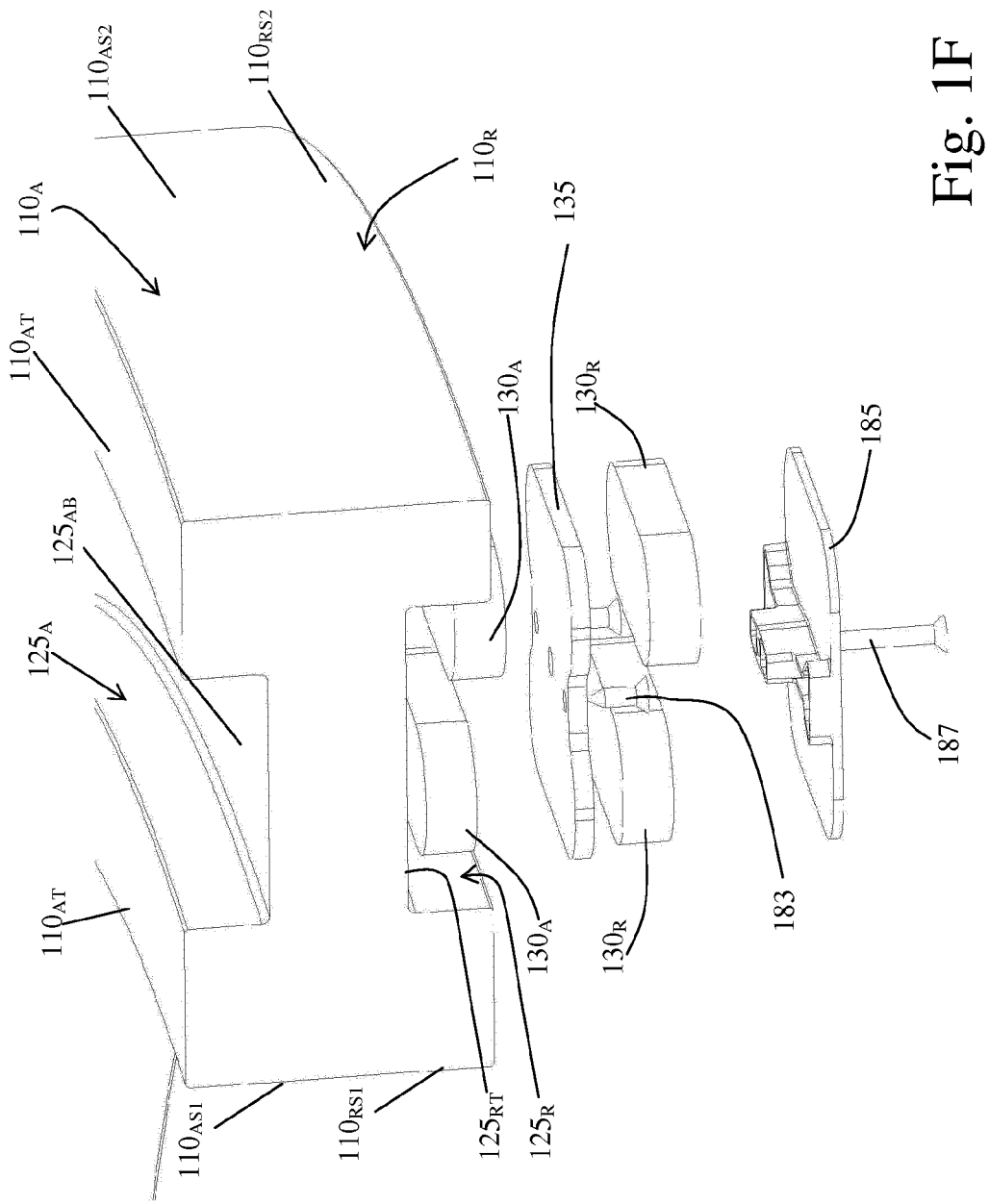
FIGS. 1F and 1G show a perspective sectional view and an exploded perspective sectional view, respectively, of a guide of said articles conveyor according to an embodiment of the present invention.
Figure 1G:
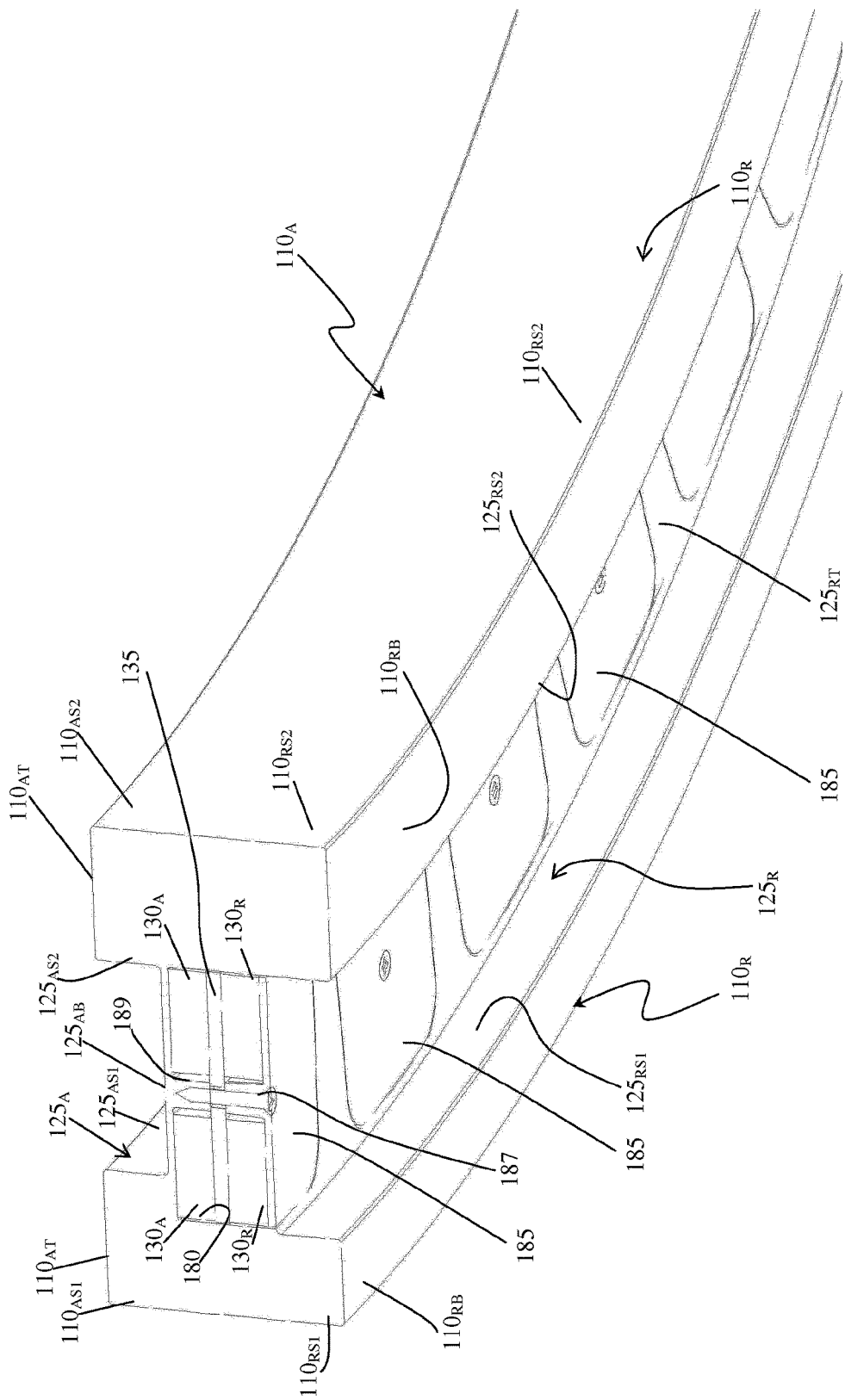

With reference also to FIGS. 1F and 1G, they show, according to an embodiment of the present invention, the forward guide $110_A$ and the return guide $110_R$ in perspective sectional views transversally the guides (particularly, in FIG. G some parts of the guides are depicted in exploded view).

In the illustrated embodiment, the forward guide $110_A$ and the return guide $110_R$ are made in a single piece, for example by mechanical processing (for example by removal of material, such as by numerical control mechanical processing techniques) from a same sheet of material, which can be a sheet of thermoplastic polymeric material.

The forward guide $110_A$ comprises a forward guide channel for the chain 105 (in the following, forward channel) $125_A$ adapted to receive the chain 105 (i.e., a part thereof, as discussed below), thereby allowing the chain 105 to be guided along the (or the respective part of) the forward section within the forward channel $125_A$.

The return guide $110_R$ comprises a return guide channel for the chain 105 (in the following, return channel) $125_R$ adapted to receive the chain 105 (i.e., a part thereof, as discussed below), thereby allowing the chain 105 to be guided along the (or the respective part of) the return section within the return channel $125_R$.

Preferably (as illustrated), the forward channel $125_A$ extends in height (i.e., along the vertical direction Y) from an outer surface $110_{AT}$ of the forward guide $110_A$ (that, in use, defines an upper surface $110_{AT}$ of the forward guide $110_A$) into the forward guide $110_A$ (i.e., downwards)—with the forward channel $125_A$ that, as can be better appreciated in FIGS. 1F and 1G, directly opens to the upper surface $110_{AT}$ of the forward guide $110_A$. Moreover, preferably (as illustrated), the forward channel $125_A$ extends in width (i.e., along the transverse direction Z) between opposite side surfaces $110_{AS1}, 110_{AS2}$ of the forward guide $110_A$—with the sizes of such extensions in height and in width that, as will be discussed below, are advantageously chosen according to the size of the link bodies $115_2$—and in length (i.e., along the longitudinal direction X) along substantially all the forward guide $110_A$ (preferably, as illustrated, opening directly to its ends).

Preferably (as illustrated), the return channel $125_R$ extends in height (i.e., along the vertical direction Y) from an outer surface $110_{RB}$ of the return guide $110_R$ (that, in use, defines a lower surface $110_{RB}$ of the return guide $110_R$) into the return guide $110_R$ (i.e. upwards)—with the return channel $125_R$ that, as can be better appreciated in FIGS. 1F and 1G, directly opens to the lower surface $110_{RB}$ of the return guide $110_R$. Moreover, preferably (as illustrated), the return channel $125_R$ extends in width (i.e., along the transverse direction Z) between opposite side surfaces $110_{RS1}, 110_{RS2}$ of the return guide $110_R$—with the sizes of such extensions in height and in width that, as will be discussed below, are advantageously chosen according to the size of the link bodies $115_2$—and in length (i.e., along the longitudinal direction X) along substantially all the return guide $110_R$ (preferably, as illustrated, opening directly to its ends).

The forward channel $125_A$ delimits a lower wall $125_{AB}$ (lying in a plane substantially parallel to the plane where the upper surface $110_{AT}$ of the forward guide $110_A$ lies) and two opposite side walls $125_{AS1}, 125_{AS2}$ substantially perpendicular to the lower wall $125_{AB}$ (which side walls $125_{AS1}, 125_{AS2}$, in the example at issue, identify an outside of the curve and an inside of the curve, respectively, and, as will be understood in the following, preferably act as shoulders for an optimum guidance of the chain 105 in the forward section).

The return channel $125_R$ delimits an upper wall $125_{RT}$ (lying in a plane substantially parallel to the plane where the lower surface $110_{RB}$ of the return guide $110_R$ lies) and two opposite side walls $125_{RS1}, 125_{RS2}$ substantially perpendicular to the upper wall $125_{RT}$ (which side walls $125_{RS1}, 125_{RS2}$, in the example at issue, identify an outside of the curve and an inside of the curve, respectively, and, as will be understood in the following, preferably act as shoulders for an optimum guidance of the chain 105 in the return section).

In its general terms, according to the present invention, the return guide $110_R$ comprises magnetic interaction means adapted in use to magnetically interact with magnetic interaction means of the chain 105 to cause a magnetic attraction of the chain 105 within the return channel $125_R$ (i.e., substantially along the vertical direction Y). In this way, due to this magnetic attraction, the return channel $125_R$ is adapted to slidably receive within it the link body $115_2$, and the lower surface $110_{RB}$ of the return guide $110_R$ is adapted to form a slide abutment, external to the return guide $110_R$, for the plate $115_1$. Moreover, according to the present invention, the guide structure 110 further comprises accompanying means (discussed in the following) for accompanying the movement of the chain 105 with respect to the return channel $125_R$. As discussed in the following, said accompanying means comprises at least means for promoting an input of the chain 105 into the return channel $125_R$ (and, hence, for promoting magnetic attraction and retention of the chain 105 within the return channel $125_R$, i.e. at an inlet thereof) and means for promoting an output of the chain 105 from the return channel $125_R$ (so as to gradually accompany the detachment from the magnetic attraction at an outlet of the return channel $125_R$).

Preferably, although not necessarily, the magnetic interaction means of the guide structure 110 comprises one or more magnetic field generation elements (for example, electromagnets or, as herein assumed, permanent magnets—in the following, magnets), whereas the magnetic interaction means of the chain 105 comprises one or more elements of the chain 105 responsive to the magnetic fields (for example, the coupling pins 120, which, in the considered embodiment, for this purpose are made in ferritic steel or other ferromagnetic material). Anyway, implementations are not excluded wherein the magnets, or other magnetic field generation elements, are made in the chain 105 so as to magnetically interact with one or more elements of the guide structure 110 responsive to magnetic fields. In addition, implementations are not excluded wherein other elements of the chain 105 different from (or in addition to) the coupling pins 120 are made of ferromagnetic material—so as to be responsive to magnetic fields. Furthermore, the possibility that the whole chain 105 is made of ferromagnetic material is not excluded.

Preferably, as shown in FIGS. 1F and 1G, the magnets are arranged along the return channel $125_R$. More preferably, the magnets are arranged in appropriate seats 180 (visible in FIG. 1G), formed at preferably but not necessarily regular intervals along the return channel $125_R$, the seats 180 being preferably formed (similarly to the forward and return channels) by removal of material from the sheet of thermoplastic polymer (for example by means of numerical control mechanical processing techniques) between the upper wall $125_{RT}$ of the return channel $125_R$ and the lower wall $125_{AB}$ of the forward channel $125_A$.

According to an embodiment of the present invention, the magnets are arranged in pairs thereby forming a first pair of magnets $130_A$ and a second pair of magnets $130_R$: the first pair of magnets $130_A$ determines the magnetic attraction of the chain 105 within the forward channel $125_A$, whereas the second pair of magnets $130_R$ determines the magnetic attraction of the chain 105 within the return channel $125_R$—as better discussed in the following, however, the first pair of magnets $130_A$ for determining the magnetic attraction of the chain 105 within the forward channel $125_A$ may also be omitted in embodiments of the present invention, as the chain 105 in the forward section is naturally subjected to gravity.

Advantageously, the magnets of each pair $130_A$ and $130_R$ are magnetic ferritic magnets having relatively low cost, arranged in the same seat 180 spaced apart from one another, and are preferably connected by magnetic interaction to a plate 135 of ferromagnetic material that separates the first pair of magnets $130_A$ and the second pair of magnets $130_R$ from each other. In this way, the plate 135, advantageously located below the first pair of magnets $130_A$ and above the second pair of magnets $130_R$, defines, together with the two respective pairs of magnets $130_A$ and $130_R$, U-shaped (or horseshoe-shaped) magnets. Thanks to the two U-shaped magnets, it is possible to ensure (with low cost) an optimal magnetic interaction (attraction) with magnetically responsive elements of the chain 105, as a high number and a high intensity of field lines of the magnetic field associated with the U-shaped magnets can intercept the coupling pins 120 between the links of the chain 105.

Anyway, the use of ferritic magnets $130_A,130_R$ and/or the provision of the ferromagnetic plates 135 that allow achieving the U-shape geometry may be omitted according to specific design requirements (for example, for reasons of amount of space to be occupied), in which case it is possible to provide for the use of more effective, although more expensive, magnets, such as Boron-Neodymium permanent magnets (the latter having small size while ensuring, at the same time, high-intensity field lines of the magnetic field). In this case, it may be sufficient to arrange in each site 180 even one magnet, with magnetic axis oriented substantially perpendicularly to the lower wall $125_{AB}$ of the forward channel $125_A$ and to the upper wall $125_{RT}$ of the return channel $125_R$ (for example, with the north polarity upwards and the south polarity downwards, or vice versa), without the need of the ferromagnetic plate 135.

According to alternative embodiments of the present invention, not shown, the (first pairs of) magnets $130_A$ can also be accommodated in seats different from the seats in which the (second pairs of) magnets $130_R$ are housed. For example, it is possible to provide, along the return channel $125_R$, a first plurality of seats for the (first pairs of) magnets $130_A$ and a second plurality of seats, for example interposed at least partly to the seats of the first plurality, for the (second pairs of) magnets $130_R$.

As visible in FIG. 1F, the plate 135 is preferably fixed to the body of the return guide $110_R$ by fixing means, more preferably screws 183, such as two screws 183 (as exemplary illustrated).

The seats 180 for the magnets $130_A,130_R$ are preferably closable (and, hence, accessible), preferably from below, by respective lids or caps 185, preferably made of a non-magnetic material, more preferably made of a plastic material (i.e., not made of a ferromagnetic material). Each lid 185 is preferably fixed to the body of the return guide $110_R$ by fixing means, such as a screw 187 screwed into a threaded hole preferably formed in a median septum 189 that essentially divides the respective seat 180 in two parts.

The use of screws 183 and 187 for fixing the plates 135 and the lids 185 makes assembly and disassembly operations feasible and easy.

Thanks to the magnetic attraction of the magnets $130_A$, $130_R$, during the movement of the chain 105 the link bodies $115_2$ of the chain 105 are attracted, in the forward section, toward the lower wall $125_{AB}$ of the forward channel $125_A$, and, in the return section, toward the upper wall $125_{RT}$ of the return channel $125_R$, sliding along them (in contact or without contact, as discussed in the following).

As mentioned above, the seats 180 for the magnets $130_A,130_R$ are preferably accessible from below, that is from the bottom of the guide structure 110, being instead inaccessible at the top thereof. In this way, in use, the same guide structure 110 acts as a shield, that is as an "umbrella", that avoids that liquid and slurry (for example, liquids used for periodic cleaning of the articles conveyor 100, or slurry that may escape from the transported articles) penetrate into the seats 180 thereby stagnating therein, thus making removal for hygienic reasons difficult and promoting instead the proliferation and spread of bacteria.

Preferably, the extensions in height of the forward channel $125_A$ and of the return channel $125_R$ are such that the link bodies $115_2$ of the chain 105 are completely received within the forward $125_A$ and return $125_R$ channels, by sliding inside/along the forward $125_A$ and return $125_R$ channels while skimming on (i.e., at a very short distance from) the lower wall $125_{AB}$ of the forward channel $125_A$ in the forward section, and the upper wall $125_{RB}$ of the return channel $125_R$ in the return section, with the respective plates $115_1$ (that is, the secondary surfaces $S_S$) that slide with contact (i.e., in adherence) along the upper surface $110_{AT}$ of the forward guide $110_A$ and along the lower surface $110_{RB}$ of the return guide $110_R$—or, equivalently, the extensions in height of the forward $125_A$ and return $125_R$ channels are sufficiently larger than the height of the link body $115_2$ that the secondary surface $S_S$ of the plate $115_1$, by abutting on the upper surface $110_{AT}$ of the forward guide $110_A$ and on the lower surface $110_{RB}$ of the return guide $110_R$, allows the body link $115_2$ to penetrate down to the lower wall $125_{AB}$ of the forward channel $125_A$ and up to the upper wall $125_{RT}$ of the return channel $125_R$, without contacting them (however, according to the inevitable constructional tolerances of the chain 105 and of the forward $125_A$ and return $125_R$ channels, a slight contact, or touch, between the body link $115_2$ and the lower wall $125_{AB}$ of the forward channel $125_A$ and/or the upper wall $125_{RT}$ of the return channel $125_R$ could be provided or allowed). Therefore, the sliding of the plates $115_1$ takes place externally to the forward guide $110_A$ (in the forward section) and externally to the return guide $110_R$ (in the return section), whereby the forward $110_A$ and return $110_R$ guides can be adapted to chains with plates of different thickness, with the contact between the plates $115_1$ (namely, between the respective secondary surfaces $S_S$) and the lower surface $110_{RB}$ of the return guide $110_R$ that provides stability to the chain 105 along the return section (and with the contact between the plates $115_1$, namely between the respective secondary surfaces $S_S$, and the upper surface $110_{AT}$ of the forward guide $110_A$ that provides stability to the chain 105 along the forward section).

Still more preferably, the extension in width of the return channel $125_R$ is such that the link bodies $115_2$ slide along the return channel $125_R$ in contact also with the side wall $125_{RS2}$ (assuming the illustrated curve direction and assuming that, as usual, the chain 105 is actuated in traction rather than in thrust), so as to ensure optimum stability of the chain 105 along the return section—in other words, taking as reference the feed direction of the chain 105, the inside of the curve (the side wall $125_{RS2}$ in the example at issue), or the outside of the curve (the side wall $125_{RS1}$) in implementations in which the chain 105 is driven in thrust rather than in traction, acts as a shoulder for the link bodies $115_2$ of the chain 105. Advantageously, in order to avoid that, as a result of such a contact, the wear of the link bodies $115_2$ (i.e., of the rear coupling region $115_{2Aa}$ in contact with the side wall $125_{RS2}$) exposes the coupling pins 120 (which, in their turn, may rub against the side wall $125_{RS2}$ of the return channel $125_R$ thereby decreeing deterioration), each coupling pin 120 between the links 115 of the chain 105 is sufficiently long to allow the correct coupling between the respective links 115, but short enough to remain covered by the link body $115_2$ (i.e., by the rear coupling region $115_{2Aa}$) even after a significant wear thereof. Additionally or alternatively, the link body $115_2$ (or at least the portions thereof that, in use, may come into contact with the walls of the return channel $125_R$) and/or the walls of the return channel $125_R$ (or at least the portions thereof that, in use, may come into contact with the link body $115_2$) may advantageously be made of (or covered with) materials whose mutual contact generates little or negligible friction, and hence low wear.

In the considered embodiment, the sliding of the link bodies $115_2$ in contact with the side wall $125_{RS2}$ of the return channel $125_R$ (in addition to the sliding of the plates $115_1$ in contact with the lower surface $110_{RB}$ of the return guide $110_R$) allows guiding the chain 105 within the return channel $125_R$ with high stability and accuracy, and allows making the chain 105 substantially unaffected by possible mechanical vibrations. In addition, thanks to the presence of the magnets $130_R$ (or of the U-shaped magnets) and to the attraction they exert on the chain 105 along the return channel $125_R$, the return channel $125_R$, contrary to the prior art solutions, does not need grooves along the side walls $125_{RS1}, 125_{RS2}$ to completely accommodate the chain 105 within the return channel $125_R$ and to support it from below—see, for example, the prior art return guide $210_R'$ illustrated in FIG. 2C for only purposes of comparison, which comprises, along the side walls $225_{RS1}', 125_{RS2}'$ of the return channel $225_R'$, grooves $225_{RG}'$ suitable to accommodate the plate $115_1$ and to support it from below (so as to support the chain 105 from below). This involves a considerable constructional simplicity of the return guide $110_R$, as well as a lower use of material for its making.

In the exemplary considered embodiment, the accompanying means comprise a guiding element 140 (for example, a wedge-shaped element, a sliding shoe, a shoe, a ramp or, as visible in FIGS. 1C, 1D and 1E, an idle roller) to guide the chain 115 (i.e., to encourage/facilitate its entry) into the return channel $125_R$, i.e. to guide the link bodies $115_2$ into the return channel $125_R$ and bring in adherence the respective plates $115_1$ (i.e., the secondary surfaces $S_S$ of the plates $115_1$) with the lower surface $110_{RB}$ of the return guide $110_R$. Preferably, the roller 140 is positioned in proximity of the inlet of the return channel $125_R$, and at such a distance (along the vertical direction Y) from the lower surface $110_{RB}$ of the return guide $110_R$ (hereinafter, vertical distance) that the chain 105, by sliding on the roller 140, is substantially aligned with the inlet of the return channel $125_R$, and sufficiently close to the magnets $130_R$ to be effectively intercepted by the field lines of the magnetic field generated by them. Once entered the return channel $125_R$, the magnetic interaction between the chain 105 and the magnets $130_R$ causes the attraction of the chain 105 toward, and retention of the chain 105 at, the upper wall $125_{RT}$, thereby allowing the guided sliding of the chain 105 within the return channel $125_R$ (i.e., at the inlet thereof). In other words, the roller 140 is adapted to accompany the chain 105 at the inlet of the return channel $125_R$ and to facilitate the magnetic attraction towards, and retention at, the upper wall $125_{RT}$.

As mentioned above, additionally to the guiding element 140, the accompanying means also comprises an additional guiding element (or other wedge-shaped or sliding shoes elements) 150, e.g. similar to the roller 140 (see FIGS. 1A, 1D and 1E).

The roller 150 is positioned in proximity of the outlet of the return channel $125_R$, and, preferably, at such a vertical distance that the chain 105, by sliding on the roller 150, moves away/detaches gradually (i.e., not abruptly) from the upper wall $125_{RT}$ at the outlet of the return channel $125_R$ where the holding action of the magnet fails—otherwise, the detachment of the chain 105 (from the upper wall $125_{RT}$) at the outlet of the return channel $125_R$ could propagate back to the inlet of the return channel $125_R$. In other words, the roller 150 acts as a disengagement element for promoting the exit of the chain 105 from the return channel $125_R$ in a controlled manner.

Advantageously, as visible in FIGS. 1A and 1E, a further roller 145 is provided for acting primarily as a support element of the chain 105. In order to achieve that, the roller 145 is positioned along the return channel $125_R$ (i.e., between the inlet and the outlet thereof) so as to split/divide the chain 105 in the respective segments or portions (the weight of each segment being correspondingly split/divided with respect to the whole weight of the chain 105)—in the example at issue wherein the roller 145 is positioned substantially in the middle of the return channel $125_R$, two chain segments are provided each one with half weight compared to the whole weight of the chain 105.

In this way, in case of detachment of one or more links 115 (e.g., due to interventions on the articles conveyor 100 such as inspection or cleaning), the propagation of such a detachment remains confined to the chain segment to which such links 115 belong. Accordingly, the magnetic attraction, having to act only on the detached chain segment (whose weight is lower than the weight of the whole chain 105) is sufficient to automatically restore the position of the chain 105 in adherence to the return guide $110_R$. Anyway, additional rollers (not shown) may be provided along the return guide $110_R$, so as to split/divide the weight of the chain 105 differently—with the number of such rolls that can be chosen according to the weight of the chain 105 (for example, a larger number of rollers for heavy chains and a smaller number of rollers for light chains).

Last, but not least, the rollers 140,145 (and, preferably, the roller 150 and/or any additional roller, when provided) also allow supporting the chain 105 in case of (even temporary) absence of magnetic attraction—without the intervention of such rollers the chain 105 would instead be subject to detachment from the return channel $125_R$ (with possible consequent change of the path defined by it) and would require laborious repositioning operations.

Preferably, although not necessarily, adjustment means are also provided for adjusting the position of the rollers 140,145,150 with respect to the return channel $125_R$—anyway, even only the adjustment of one or some of these rollers 140,145,150 may be provided. Preferably, the vertical distance of the rollers 140,145,150 is adjustable (along the vertical direction Y) according to the size of the chain 105 (e.g., the thickness of the plates $115_1$)—with the vertical distances of the rollers 140,145,150 that, contrary to what is illustrated by way of example, can be mutually different. In this regard, as can be better appreciated in FIGS. 1A, 1B and 1E, the carter $110_C$ is preferably provided with (i.e., the adjustment means has) three pairs of vertical openings or slots $140_O, 145_O, 150_O$, with each pair that, associated with a respective roller 140,145,150, comprises two vertical openings $140_O, 145_O, 150_O$ at respective side walls opposite the carter $110_C$ parallel to the side surfaces $110_{RS1}, 110_{RS2}$ (only one vertical opening $140_O, 145_O, 150_O$ for each pair being visible in the above figures), so that each roller 140,145,150 can vertically slide along the respective (pairs of) openings $140_O, 145_O, 150_O$, and be fixed in the desired position—for example, by bolts $140_B, 145_B, 150_B$ (or other fixing means). As should be apparent, the adjustment of the vertical distance of the rollers 140,145,150 from the return channel $125_R$ further makes easy the adaptability of the return guide $110_R$ to chains with plates of different thicknesses.

In embodiments of the present invention, the forward guide $110_A$ and the return guide $110_R$ may not be made as one piece (i.e., they are not necessarily manufactured by removal of material from a same sheet of thermoplastic material). For example, the forward guide $110_A$ and the return guide $110_R$ may be manufactured as separate parts, by machining them from different sheets of thermoplastic material. In such cases, the seats for the magnets are advantageously formed in the return guide $110_R$ (e.g., so as to provide the magnets as close as possible to the return channel $125_R$ in order to obtain effective magnetic attraction in the most delicate section of the path, i.e. the return section), with a structure similar to that of the embodiment previously described, i.e. with the seats accessible from below (so that in use the return guide $110_R$ acts as a shield or "umbrella" against the infiltration of liquids and slurry in the seats where the magnets are housed). Even in the embodiments in which the forward guide $110_A$ and the return guide $110_R$ are made as separate parts, it is possible to provide that the seats are formed in the return guide $110_R$, and that each seat houses the (e.g., first pairs of) magnets $130_A$ for the forward section and the (e.g., second pairs of) magnets $130_R$ for the return section.

Figure 2A:
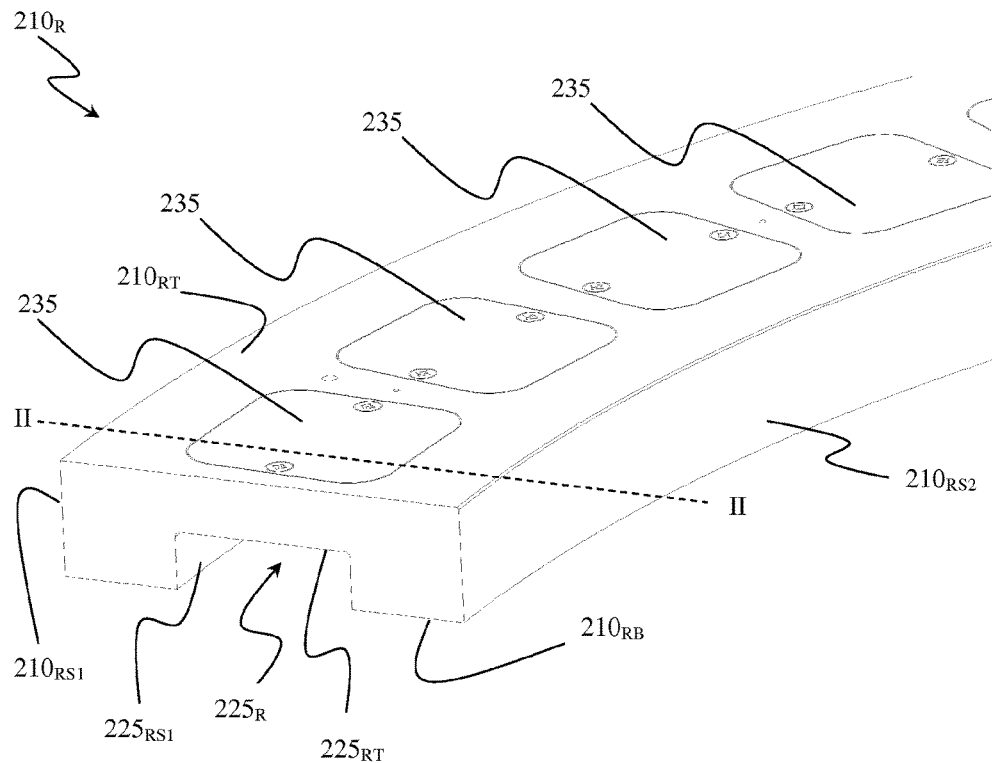
FIGS. 2A and 2B show a perspective view and a sectional view, respectively, of a return guide of said articles conveyor according to another embodiment of the present invention.
Figure 2B:
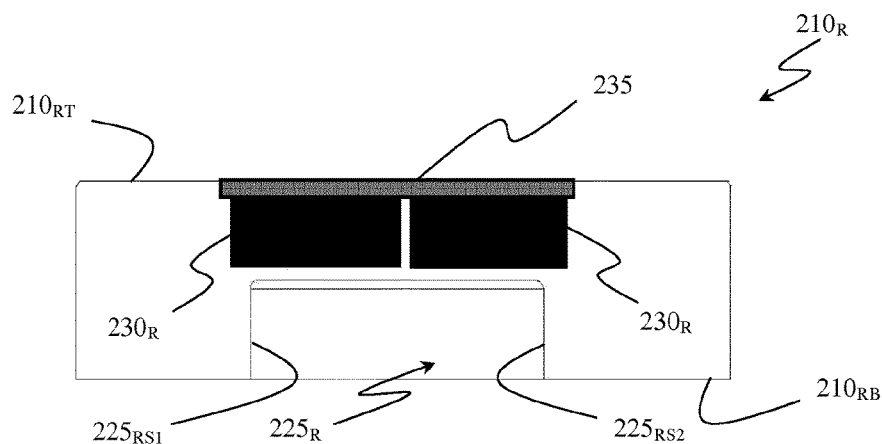
Figure 2C:
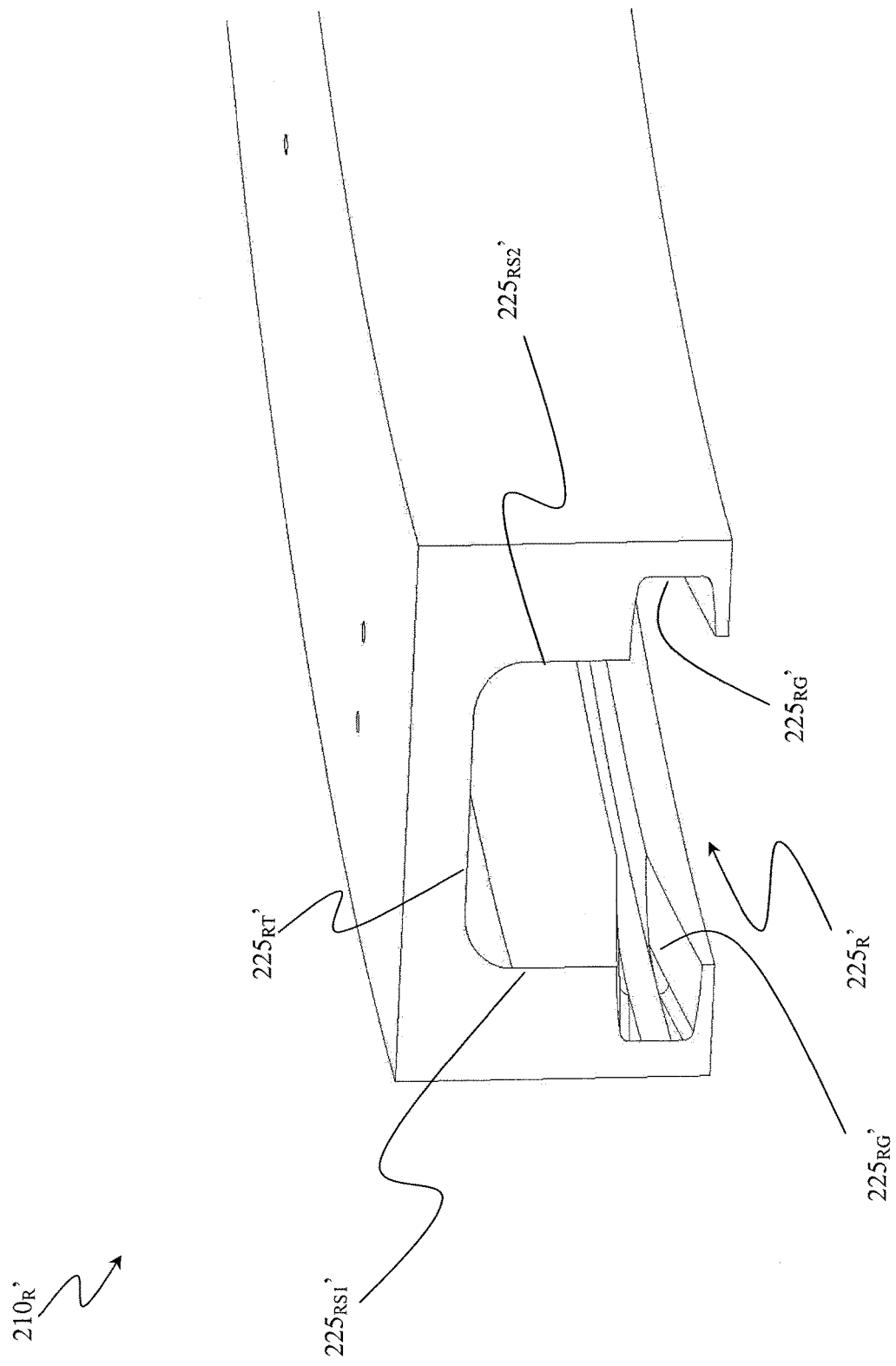
FIG. 2C shows, in a perspective view, a prior-art return guide.

In any case, the present invention can also be applied to only one return guide, regardless of the forward guide, the forward guide being made in any way whatsoever, even without contemplating the chain guide by means of magnetic attraction: in this case, the seats formed in the return guide can only accommodate the magnets for the return section. This is illustrated in FIGS. 2A and 2B, which show, according to another embodiment of the present invention, a return guide $210_R$ in perspective view and in sectional view along the section axis II-II of FIG. 2A, respectively (in these figures, the chain 105 and the links 115 are not shown).

Similarly to the above, the return guide $210_R$ comprises a return channel $225_R$ adapted to receive the chain 105 (i.e., a part thereof), thereby allowing the chain 105 to be guided along the (or the respective part of) the return section within the return channel $225_R$.

Similarly to the above, preferably (as illustrated), the return channel $225_R$ extends in height (i.e., along the vertical direction Y) from an outer surface $210_{RB}$ of the return guide $210_R$ (that, in use, defines a lower surface $210_{RB}$ of the return guide $210_R$) into the return guide $210_R$ (i.e. upwards)—with the return channel $225_R$ that directly opens to the lower surface $210_{RB}$ of the return guide $210_R$. Moreover, preferably (as illustrated), the return channel $225_R$ extends in width (i.e., along the transverse direction Z) between opposite side surfaces $210_{RS1}, 210_{RS2}$ of the return guide $210_R$— with the sizes of such extensions in height and in width that, as will be discussed below, are advantageously chosen according to the size of the link bodies $115_2$—and in length (i.e., along the longitudinal direction X) along substantially all the return guide $210_R$ (preferably, as illustrated, opening directly to its ends).

Similarly to the above, the return channel $225_R$ delimits an upper wall $225_{RT}$ (lying in a plane substantially parallel to the plane where the lower surface $210_{RB}$ of the return guide $210_R$ lies) and two opposite side walls $225_{RS1}, 225_{RS2}$ substantially perpendicular to the upper wall $225_{RT}$ (which side walls $225_{RS1}, 225_{RS2}$, in the example at issue, identify an outside of the curve and an inside of the curve, respectively, preferably acting as shoulders, as in the former discussion, for an optimum guidance of the chain 105 in the return section).

Similarly to the above, according to an embodiment of the present invention, the return guide $210_R$ comprises magnetic interaction means adapted, in use, to magnetically interact with magnetic interaction means of the chain 105 to cause a magnetic attraction of the chain 105 within the return channel $225_R$ (i.e., substantially along the vertical direction Y). In this way, due to this magnetic attraction, the return channel $225_R$ is adapted to slidably receive the link body $115_2$ within it, and the lower surface $210_{RB}$ of the return guide $210_R$ is adapted to act as a slide abutment, external to the return guide $210_R$, for the plate $115_1$.

Similarly to the above, the magnetic interaction means of the return guide 210 preferably comprises one or more magnetic field generation elements (for example, electromagnets or, as herein assumed, permanent magnets—in the following, magnets), whereas the magnetic interaction means of the chain 105 comprises one or more elements of the chain 105 responsive to the magnetic fields (for example, the coupling pins 120, which, in the considered embodiment, for this purpose are made in ferritic steel or other ferromagnetic material). Anyway, similarly to the above, implementations are not excluded wherein the magnets, or other magnetic field generation elements, are made in the chain 105 so as to magnetically interact with one or more elements of the return guide $210_R$ responsive to magnetic fields. In addition, implementations are not excluded wherein other elements of the chain 105 different from (or in addition to) the coupling pins 120 are made of ferromagnetic material—so as to be responsive to magnetic fields. Furthermore, the possibility that the whole chain 105 is made of ferromagnetic material is not excluded.

In this embodiment magnets $230_R$ are arranged along the return channel $225_R$, more preferably they are arranged in appropriate seats (not shown) of the return guide $210_R$ (similar to the seats 180 and preferably formed by removal of material from the sheet of thermoplastic polymer, e.g. by means of numerical control mechanical processing techniques) between the upper wall $225_{RT}$ of the return channel $225_R$ and an upper surface $210_{RT}$ of the return guide $210_R$. Preferably, similarly to the previously illustrated embodiment, the magnets $230_R$ are arranged in pairs, with the magnets $230_R$ of each pair that are arranged in a same seat spaced apart from one another and are connected by magnetic interaction with a respective plate 235. Preferably, the plate 235 is structurally and functionally similar to the plate 135, and similar fixing means can be used for its fixing to the return guide $210_R$—for example, screws, visible in FIG. 2A, can be used for fixing the plate 235 to the body of the return guide $210_R$, preferably into a threaded hole formed in a median septum of the seat). Similarly to the above, each plate 235 is preferably made of ferromagnetic material, so as to define, together with the respective pair of magnets $230_R$, a U-shaped (or horseshoe-shaped) magnet. However, differently from the above embodiments, each plate 235 is arranged above the respective pair of magnets $230_R$ (so as to act also as a lid for the seat in which the pair of magnets $230_R$ are housed). This allows obtaining a significant manufacturing ease (as a single plate 235 is provided that acts both as part of the U-shaped magnet and as lid, contrary to the previous embodiment wherein both the plate 135 and the lid 185 are provided). Thanks to the U-shaped magnets, it is possible to ensure (with low costs) an efficient magnetic interaction (attraction), as a high number and a high intensity of field lines of the magnetic field associated with to the U-shaped magnet can intercept the coupling pins 120—in any case, the U-shape geometry may be omitted according to specific design requirements (such as for space occupation issues), in which case it is possible to provide for the use of Boron-Neodymium permanent magnets (the latter having small size while ensuring, at the same time, high-intensity field lines of the magnetic field).

Similarly to the above, thanks to the efficient magnetic attraction of the U-shaped magnets $230_R,235$, during the movement of the chain 105 the link body $115_2$ is attracted towards the upper wall $225_{RT}$ of the return channel $225_R$, sliding along it (in contact or without contact, as discussed herebelow). Preferably, the extensions in height of the return channel $225_R$ are such that the link bodies $115_2$ of the chain 105 are completely received within the return channel $225_R$, by sliding inside/along the return channel $225_R$ channels while skimming on (i.e., at a very short distance from) the upper wall $225_{RT}$ of the return channel $225_R$, with the respective plates $115_1$ (that is, the secondary surface $S_S$) that slide with contact (i.e., in adherence) along the lower surface $210_{RB}$ of the return guide $210_R$—or, equivalently, the extension in height of the return channel $225_R$ is sufficiently larger than the height of the link body $115_2$ that the secondary surface $S_S$ of the plate $115_1$, by abutting on the lower surface $210_{RB}$ of the return guide $210_R$, allows the body link $115_2$ to penetrate up to the upper wall $225_{RT}$ of the return channel $225_R$, without contacting it (however, according to the inevitable constructional tolerances of the chain 105 and of the return channel $225_R$, a slight contact, or touch, between the body link $115_2$ and the upper wall $225_{RT}$ of the return channel $225_R$ could be provided or allowed). Therefore, the sliding of the plates $115_1$ takes place externally to the return guide $210_R$, whereby the return guide $210_R$ can be adapted to chains with plates of different thickness, with the contact between the plates $115_1$ (namely, between the respective secondary surfaces $S_S$) and the lower surface $210_{RB}$ of the return guide $210_R$ that provides stability to the chain 105 along the return section.

Still more preferably, as discussed above, the extension in width of the return channel $225_R$ is such that the link bodies $115_2$ slide along the return channel $225_R$ in contact also with the side wall $225_{RS2}$ thereof (assuming the illustrated curve direction and assuming that, as usual, the chain 105 is actuated in traction rather than in thrust), so as to ensure optimum stability of the chain 105 along the return section—in other words, taking as reference the feed direction of the chain 105, the inside of the curve (the side wall $225_{RS2}$ in the example at issue), or the outside of the curve (the side wall $225_{RS1}$) in implementations in which the chain 105 is driven in thrust rather than in traction, acts as a shoulder for the link bodies $115_2$ of the chain 105. Advantageously, in order to avoid that, as a result of such a contact, the wear of the link bodies $115_2$ (i.e., of the rear coupling region $115_{2Aa}$ in contact with the side wall $225_{RS2}$) exposes the coupling pins 120 (which, in their turn, may rub against the side wall $225_{RS2}$ of the return channel $225_R$ thereby decreeing deterioration), each coupling pin 120 between the links 115 of the chain 105 is sufficiently long to allow the correct coupling between the respective links 115, but short enough to remain covered by the link body $115_2$ (i.e., by the rear coupling region $115_{2Aa}$) even after a significant wear thereof. Additionally or alternatively, the link body $115_2$ (or at least the portions thereof that, in use, may come into contact with the walls of the return channel $125_R$) and/or the walls of the return channel $225_R$ (or at least the portions thereof that, in use, may come into contact with the link body $115_2$) may advantageously be made of (or covered with) materials whose mutual contact generates little or negligible friction, and hence low wear.

Thus, even in this embodiment the sliding of the link bodies $115_2$ in contact with the side wall $225_{RS2}$ of the return channel $225_R$ (in addition to the sliding of the plates $115_1$ in contact with the lower surface $210_{RB}$ of the return guide $210_R$) allows guiding the chain 105 within the return channel $225_R$ with high stability and accuracy, and allows making the chain 105 substantially unaffected by possible mechanical vibrations. In addition, thanks to the presence of the magnets $230_R$ (or of the U-shaped magnets $230_R,235$) and to the attraction they exert on the chain 105 along the return channel $225_R$, the return channel $225_R$, contrary to the prior art solutions, does not need grooves along the side walls $225_{RS1},225_{RS2}$ to completely accommodate the chain 105 within the return channel $125_R$ and to support it from below—see, for example, the prior art return guide $210_R'$ illustrated in FIG. 2C for only purposes of comparison, which comprises, along the side walls $225_{RS1}'$, $125_{RS2}'$ of the return channel $225_R'$, grooves $225_{RG}'$ suitable to accommodate the plate $115_1$ and to support it from below (so as to support the chain 105 from below). This involves a considerable constructional simplicity of the return guide $110_R$, as well as a lower use of material for its making.

In embodiments of the present invention, the forward guide and/or the return guide may comprise, with respect to the embodiments previously described, a larger number of (e.g., three) forward channels and/or return channels (multi-channel guides).

Figure 3A:
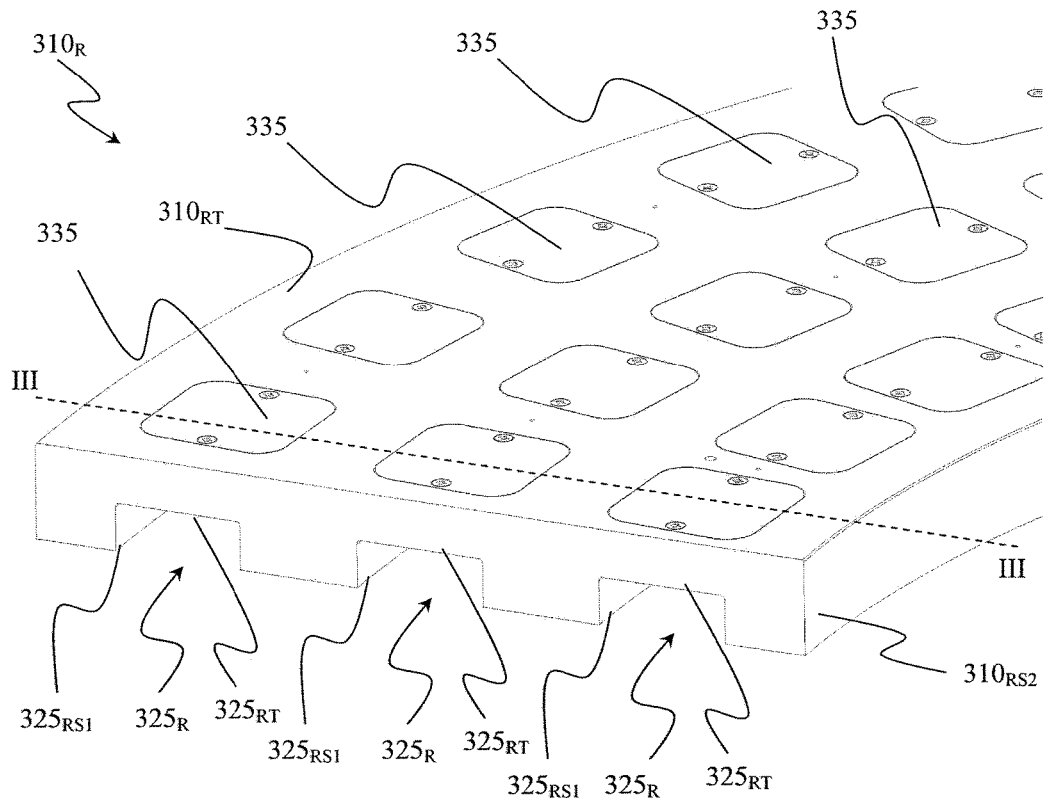
FIGS. 3A and 3B show a perspective view and a sectional view, respectively, of a return guide of said articles conveyor according to another embodiment of the present invention.
Figure 3B:
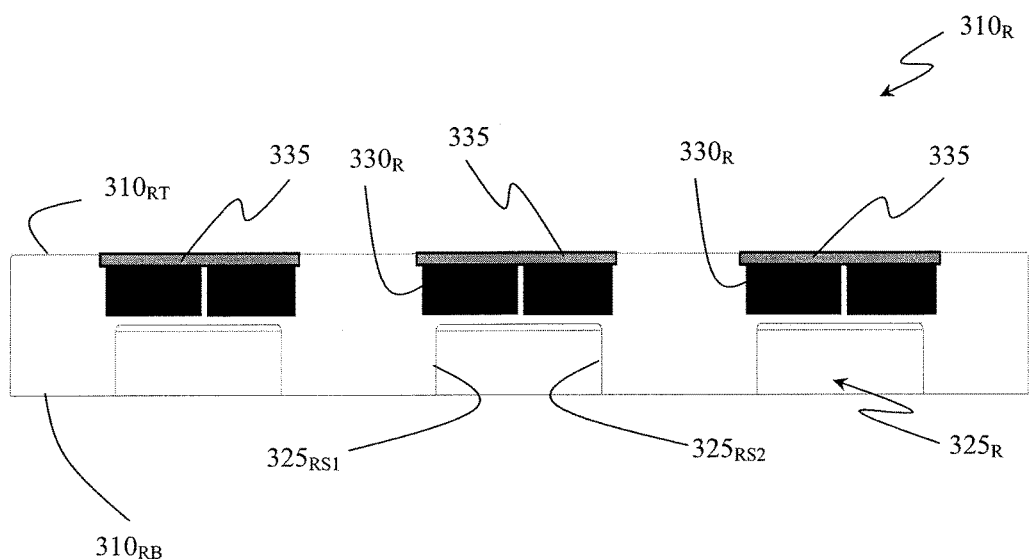

An exemplary multi-channel return guide $310_R$ is shown in the perspective view of FIG. 3A and in the sectional view of FIG. 3B along the section axis III-III of FIG. 3A (the return guide being exemplary illustrated as derived from the embodiment of FIGS. 2A and 2B, although this should not be construed as limitative).

Figure 3C:
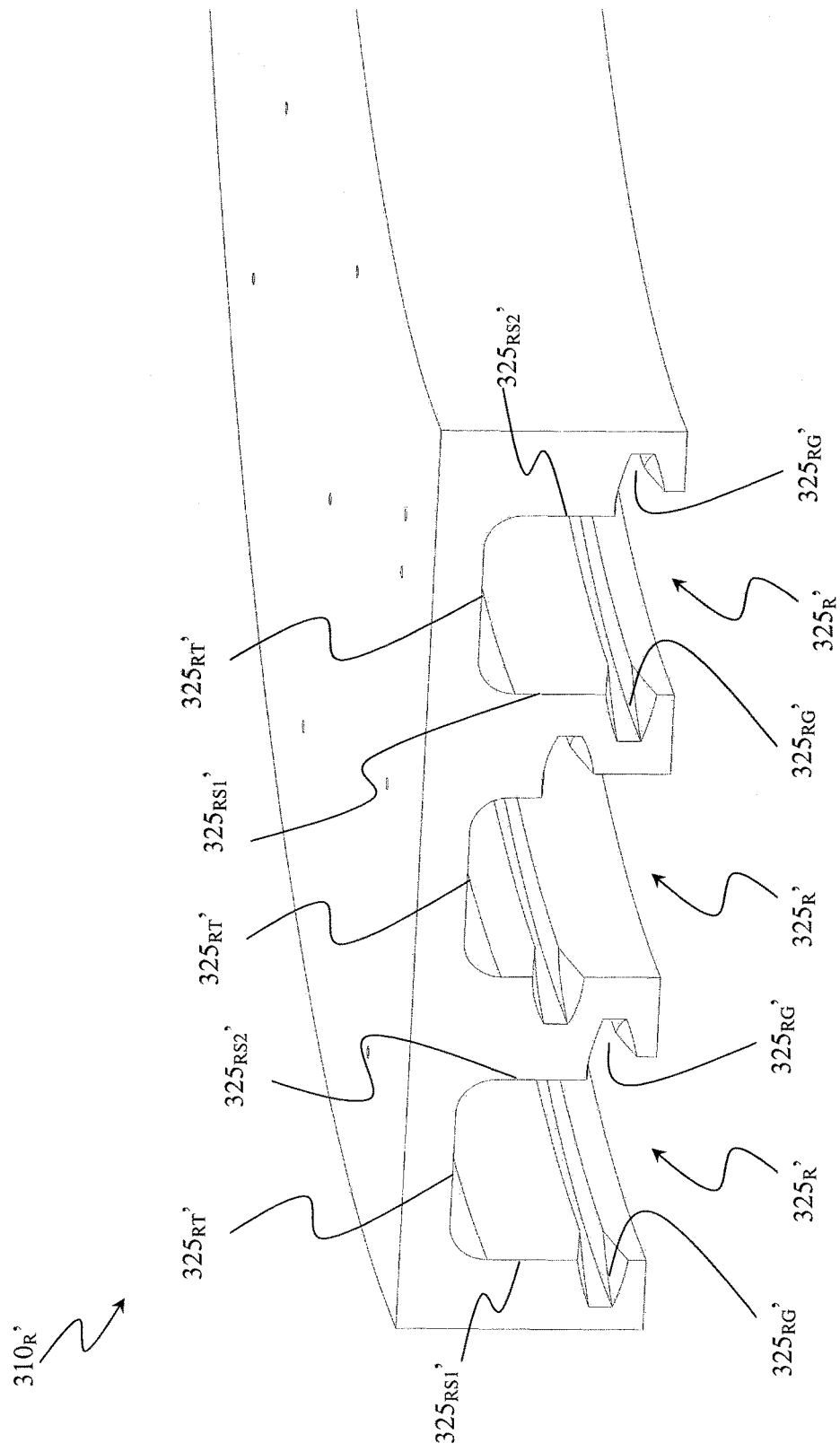
FIG. 3C shows, in a perspective view similar to that of FIG. 3A, a prior-art return guide.

The return guide $310_R$ is substantially equivalent to the return guide $210_R$ previously discussed, with respect to which it has a replicated structure. In particular, the return guide $310_R$ comprises three return channels $325_R$ for accommodating respective chains (not shown) adapted to be moved in parallel with respect to each other. The simplicity of the channels $325_R$, and in particular the absence of grooves (for the plates $115_1$ of the links 115) that, in the prior art solutions, impose to make mutually vertically staggered side-by-side channels (i.e., side-by-side channels on mutually staggered planes) to avoid "interference" between the respective grooves (as visible for the grooves $325_{RG}'$ of the prior art multi-channel return guide $310_R'$ shown in FIG. 3C), allows making the return guide $310_R$ with the return channels $325_R$ on the same plane in a simple, reliable and fast way.

Moreover, the absence of grooves (for the plates $115_1$ of the links 115) that makes the return guide $310_R$ structurally simpler, also allows obtaining lower manufacturing costs. In fact, the prior-art multi-channel return guides (such as the return guide $310_R'$ of FIG. 3C) require sheets of thermoplastic material of relatively high thickness (typically, 60-70 mm) to form the channels $325_R'$ (with the respective grooves $325_{RG}'$) sufficiently staggered between each other, whereas the proposed return guide $310_R$ requires sheets of thermoplastic material of a significantly lower thickness (for example, 20-30 mm), and hence that are cheaper.

Naturally, in order to satisfy contingent and specific requirements, a person skilled in the art may introduce the present invention many modifications and logical and/or physical changes. More specifically, although the present invention has been described with a certain level of detail with reference to one or more embodiments thereof, it should be understood that various omissions, substitutions and changes in the form and details as well as other embodiments are possible. In particular, various embodiments of the present invention may be put into practice even without the specific details (such as the numerical examples) set forth in the description to provide a more complete understanding thereof; on the contrary, well-known features may be omitted or simplified in order not to obscure the description with unnecessary details. Moreover, it is expressly intended that specific elements described in relation to each embodiment of the present invention may be incorporated in any other embodiment as a normal design choice.

Similar considerations apply if the guide has a different structure or comprises equivalent components. In any case, any component may be separated into more elements, or two or more components may be combined into a single element; furthermore, each component may be replicated to support the execution of the corresponding operations in parallel. It is also pointed out that (unless otherwise specified) any interaction between different components generally does not need to be continuous, and may be direct or indirect through one or more intermediaries.

The invention claimed is:

1. Guide for a chain for an articles conveyor, said guide comprising a return guide being adapted to guide the chain along at least a portion of a return section of a conveyor path of the articles conveyor, wherein the chain comprises a plurality of links each one having a first link element for supporting the articles to be conveyed and a second link element for supporting the first link element, and wherein the return guide comprises a return chain guide channel along the return guide, said return chain guide channel extending within the return guide from a surface of the return guide that, in use, defines a lower outer surface of the guide, characterized in that
the return guide further comprises return guide magnetic interaction means adapted in use to magnetically interact with chain magnetic interaction means to cause a magnetic attraction of the chain within the return chain guide channel, so that by effect of said magnetic attraction said return chain guide channel is adapted to slidably receive within it the second link element, and said surface of the return guide is adapted to provide a slide abutment, external to the return guide, for the first link element,
wherein the guide further comprises accompanying means for accompanying the movement of the chain with respect to said return chain guide channel, said accompanying means comprising:
means for promoting an input of the chain into, and magnetic attraction and retention of the chain within, said return chain guide channel, and
means for promoting an output of the chain from said return chain guide channel.

2. Guide according to claim 1, wherein said return guide magnetic interaction means comprises at least one magnetic field generation element and said chain magnetic interaction means comprises at least one element of the chain responsive to magnetic fields.

3. Guide according to claim 1, wherein said return guide magnetic interaction means comprises a plurality of magnets along said return chain guide channel.

4. Guide according to claim 1, wherein said return chain guide channel extends within the return guide from said surface of the return guide towards a further surface of the return guide opposite to said surface, and comprises a first wall parallel to said surface of the return guide, wherein said return guide magnetic interaction means is arranged in the return guide between said first wall and said further surface of the return guide.

5. Guide according to claim 4, wherein said return chain guide channel extends within the return guide from said surface of the return guide towards said further surface of the return guide by such an extent that, as a result of said magnetic attraction, the second link element is slidably received within the return chain guide channel up to the proximity of said first wall.

6. Guide according to claim 4, wherein said return chain guide channel comprises a second and a third walls parallel to each other and perpendicular to said first wall, said second and a third walls being spaced apart so that, as a result of said magnetic attraction, the second link element is slidably received within the return chain guide channel in contact with said second or said third walls.

7. Guide according to claim 4, wherein said guide magnetic interaction means are housed in a plurality of seats formed along the return chain guide channel and each one extending within the guide from said first wall.

8. Guide according to claim 7, wherein each seat is accessible from below when the guide is in operating position, so that in use the guide itself acts as a shield against penetration of liquids, sludge and dirt into the seat housing the guide magnetic interaction means.

9. Guide according to claim 1, further comprising a forward guide adapted to guide the chain along at least a portion of a forward section of the conveyor path of the articles conveyor, said forward guide comprising a forward chain guide channel opposite to said return chain guide channel, said forward chain guide channel extending within the guide from a surface of the forward guide opposed to said surface of the return guide and that, in use, defines an upper outer surface of the guide, said chain magnetic interaction means causing a magnetic attraction of the chain into the forward chain guide channel so that by effect of said magnetic attraction said forward chain guide channel is adapted to slidably receive within it the second link element, and said surface of the forward guide is adapted to provide a slide abutment, external to the guide, for the first link element.

10. Guide according to claim 9, wherein said forward chain guide channel extends within the guide from the surface of the forward guide and comprises a second wall parallel to said surface of the return guide, said seats for the guide magnetic interaction means extending within the guide from said first wall towards said second wall.

11. Guide according to claim 7, wherein said guide magnetic interaction means comprises, in each one of said seats, at least one pair of permanent magnets magnetically coupled to a plate in ferromagnetic material.

12. Guide according to claim 11, wherein said plate acts as a cap, preferably a removable cap, for closing a respective seat.

13. Guide according to claim 1, further comprising adjusting means for adjusting a position of said accompanying means with respect to the return chain guide channel.

14. Guide according to claim 1, wherein said accompanying means comprises at least one idle roller.

15. Guide according to claim 1, wherein said accompanying means further comprises means for supporting the chain between an inlet and an outlet of the return chain guide channel.

16. Guide for a chain for an articles conveyor, said guide comprising a return guide being adapted to guide the chain along at least a portion of a return section of a conveyor path of the articles conveyor, wherein the chain comprises a plurality of links each one having a first link element for supporting the articles to be conveyed and a second link element for supporting the first link element, and wherein the return guide comprises a return chain guide channel along the return guide, said return chain guide channel extending within the return guide from a surface of the return guide that, in use, defines a lower outer surface of the guide, characterized in that the return guide further comprises return guide magnetic interaction means adapted in use to magnetically interact with chain magnetic interaction means to cause a magnetic attraction of the chain within the return chain guide channel, so that by effect of said magnetic attraction said return chain guide channel is adapted to slidably receive within it the second link element, and said surface of the return guide is adapted to provide a slide abutment, external to the return guide, for the first link element, wherein said return chain guide channel extends within the return guide from said surface of the return guide towards a further surface of the return guide opposite to said surface, and comprises a first wall parallel to said surface of the return guide, wherein said return guide magnetic interaction means is arranged in the return guide between said first wall and said further surface of the return guide.

17. Guide according to claim 16, wherein the guide further comprises accompanying means for accompanying the movement of the chain with respect to said return chain guide channel, said accompanying means comprising:

means for promoting an input of the chain into, and magnetic attraction and retention of the chain within, said return chain guide channel, and means for promoting an output of the chain from said return chain guide channel.

18. Guide according to claim 16, wherein said return chain guide channel extends within the return guide from said surface of the return guide towards said further surface of the return guide by such an extent that, as a result of said magnetic attraction, the second link element is slidably received within the return chain guide channel up to the proximity of said first wall.

19. Guide according to claim 16, wherein said return chain guide channel comprises a second and a third walls parallel to each other and perpendicular to said first wall, said second and a third walls being spaced apart so that, as a result of said magnetic attraction, the second link element is slidably received within the return chain guide channel in contact with said second or said third walls.

20. Guide according to claim 16, wherein said guide magnetic interaction means are housed in a plurality of seats formed along the return chain guide channel and each one extending within the guide from said first wall.

\* \* \* \* \*

UNITED STATES PATENT AND TRADEMARK OFFICE
CERTIFICATE OF CORRECTION

PATENT NO. : 10,093,486 B2
APPLICATION NO. : 15/550878
DATED : October 9, 2018
INVENTOR(S) : Andrea Andreoli It is certified that error appears in the above-identified patent and that said Letters Patent is hereby corrected as shown below:

In the Specification

Column 11, Line 1, "$115_{2Aa}$in" should be --$115_{2Aa}$ in--.

Column 11, Line 4, "$125_R$thereby" should be --$125_R$ thereby--.

Column 11, Line 46, "$125_R$and" should be --$125_R$ and--.

Signed and Sealed this
Thirteenth Day of November, 2018

Andrei Iancu
*Director of the United States Patent and Trademark Office*